United States Patent
Druzgalski et al.

(10) Patent No.: US 8,176,046 B2
(45) Date of Patent: May 8, 2012

(54) SYSTEM AND METHOD FOR IDENTIFYING TRENDS IN WEB FEEDS COLLECTED FROM VARIOUS CONTENT SERVERS

(75) Inventors: Adrian Druzgalski, San Francisco, CA (US); Andrew Wan, San Francisco, CA (US)

(73) Assignee: FWIX, Inc., San Francisco, CA (US)

( * ) Notice: Subject to any disclaimer, the term of this patent is extended or adjusted under 35 U.S.C. 154(b) by 350 days.

(21) Appl. No.: 12/604,164

(22) Filed: Oct. 22, 2009

(65) Prior Publication Data

US 2010/0100537 A1 Apr. 22, 2010

Related U.S. Application Data

(60) Provisional application No. 61/107,635, filed on Oct. 22, 2008.

(51) Int. Cl.
*G06F 17/00* (2006.01)

(52) U.S. Cl. ........ 707/731; 707/706; 707/722; 707/736; 707/758; 709/201; 709/217; 709/230; 706/12; 706/14; 706/45; 705/7.11

(58) Field of Classification Search ................. None
See application file for complete search history.

(56) References Cited

U.S. PATENT DOCUMENTS

| | | | | |
|---|---|---|---|---|
| 7,613,690 | B2 * | 11/2009 | Chowdhury et al. | 1/1 |
| 7,984,056 | B1 * | 7/2011 | Kane | 707/749 |
| 2007/0265857 | A1 * | 11/2007 | Shivaji Rao | 705/1 |
| 2008/0077574 | A1 * | 3/2008 | Gross | 707/5 |
| 2008/0126476 | A1 * | 5/2008 | Nicholas et al. | 709/203 |
| 2008/0222241 | A1 * | 9/2008 | Arvai et al. | 709/203 |

* cited by examiner

*Primary Examiner* — Hung Le

(57) ABSTRACT

Systems and methods for identifying trends in web feeds collected from various content servers are disclosed. One embodiment includes, selecting a candidate phrase indicative of potential trends in the web feeds, assigning the candidate phrase to trend analysis agents, analyzing the candidate phrase, by each of the one or more trend analysis agents, respectively using the configured type of trending parameter, and/or determining, by each of the trend analysis agents, whether the candidate phrase meets an associated threshold to qualify as a potential trended phrase.

23 Claims, 17 Drawing Sheets fwix | Real Time
      | Local News

Home   Explore   Profile   Sign Out

SF Bay Area

Not from SF Bay Area? Try a different City

[market street]  🔍  Clear Search

Top trends: the team next year, good guys, market street, more ...

Fwix is a local newswire that stays up to date in real time.

Share news with friends and join a community of independent reporters.

[Sign in to Get Started]

Driver Reaction to Market Street Diversions Surprisingly Upbeat
SFPD officer directing personal vehicles to turn right off of Market Street at 8th Street. Photos: Matthew RothAlthough there are still some kinks that need to be ironed out on Market Street to make the six-week trial diversion of personal automobiles more efficient, the sky did not fall and reaction to ...
[Comment] [Share] [Email]   Posted by SF Streets Blog   20 hrs ago

Drivers adjusting to new Market Street rules
Police are helping drivers negotiate new traffic rules on SF's Market Street.
[Comment] [Share] [Email]   Posted by KGO   1 day ago

New Market Street restrictions create a smooth ride
San Francisco traffic cops got to work during this morning's commute directing private cars off of Market Street at Eighth and Sixth streets in an experiment to make the major traffic artery more friendly for pedestrians, cyclists, and buses – if not more ...
[Comment] [Share] [Email]   Posted by SF Gate   1 day ago

Abuse of the Mid-Market Street Corridor To Continue Unabated
Scene from this morning's Market Street closure. (credit: SFist reader Bryce) by Chris Jones Today is the first day of the City's ambitious six week experiment to revive the Mid-Market Street corridor by removing eastbound automobile traffic from the City's main drag. City officials are hopeful the plan will magically transform the beleaguered ...
[Comment] [Share] [Email]   Posted by SFist   1 day ago

Top Stories                                                    embed

**Tsunami *Not* Expected to Hit California Coast. We Hope.**
Posted 22 hrs ago

Relevant Facebook Status Update of the Day
Posted 23 hrs ago

Swine Flu Emergency Declared for South Bay
Posted 6 hrs ago

The Noe Valley Whole Foods Boycott Begins Tomorrow, September 30th ...
Posted 23 hrs ago About | Cities | iPhone | Feedback | Help | Tools | Terms | Privacy

*FIG. 4*

| Story ID | title and summary | | | | | | | | |
|---|---|---|---|---|---|---|---|---|---|
| | Dog | Cat | Cow | Sheep | | Dog | Cat | Cow | Sheep |
| 1 | 2 | 1 | 0 | 3 | | 1 | 1 | 0 | 1 |
| 2 | 0 | 0 | 0 | 2 | | 0 | 0 | 0 | 1 |
| 3 | . | . | . | . | | . | . | . | . |
| | Term Freq. = 2 | 1 | 0 | 5 | | Doc Freq. = 1 | 1 | 0 | 2 |

$$V = \begin{bmatrix} 0 & 0 & 3 & 1 \dots \\ 2 & 1 & 0 & 1 \dots \\ 0 & 0 & 1 & 0 \dots \\ \vdots & \vdots & \vdots & \vdots \end{bmatrix} = W*H$$

602 — V    604 — W    606 — H

Story ID: 1, 2, 3 ...    Word 1  Word 2 ...

FIG. 6

|   | 05 | 10 | 15 | 20 | 25 |
|---|----|----|----|----|----|
| 1 | 22 | 128 | 133 | 138 | 140 |
| 2 | 33 | 38 | 33 | 03 | 128 |
| 3 | 161 | 162 | 168 | 165 | 75 |
| 4 | 42 | 75 | 182 | 175 | 160 |
| 5 | 06 | 06 | 06 | 03 | 00 |

SYSTEM AND METHOD FOR IDENTIFYING TRENDS IN WEB FEEDS COLLECTED FROM VARIOUS CONTENT SERVERS

CLAIM OF PRIORITY

This application claims priority to U.S. Provisional Patent Application No. 61/107,635 entitled "METHODS SYSTEMS AND DATA STRUCTURES FOR PREDICTING TRENDS OF ONLINE FEEDS", which was filed on Oct. 22, 2008, the contents of which are expressly incorporated by reference herein.

BACKGROUND

Content providers use web feeds to deliver web content, in particular, web content that is regularly updated to users. Users can subscribe to web feeds, which typically include links, headlines, and/or summaries. A user can view the updated content through the feed subscription using a feed reader.

However, with the plethora of online content sources and feeds available for subscription, a user may be inundated with feeds and updates, many of which the user may not be interested in. In particular, a user may be subscribed to several sources of news feeds but only interested in stories that are local or stories that are popular, for example.

BRIEF DESCRIPTION OF THE DRAWINGS

FIG. 4 illustrates an example of a screenshot showing trends identified from local feeds and web feeds that are relevant to a selected trend.

FIG. 6 illustrates how factorization of a matrix is used to extract candidate phrases for use in evaluation of potential trends.

DETAILED DESCRIPTION

Figure 1:
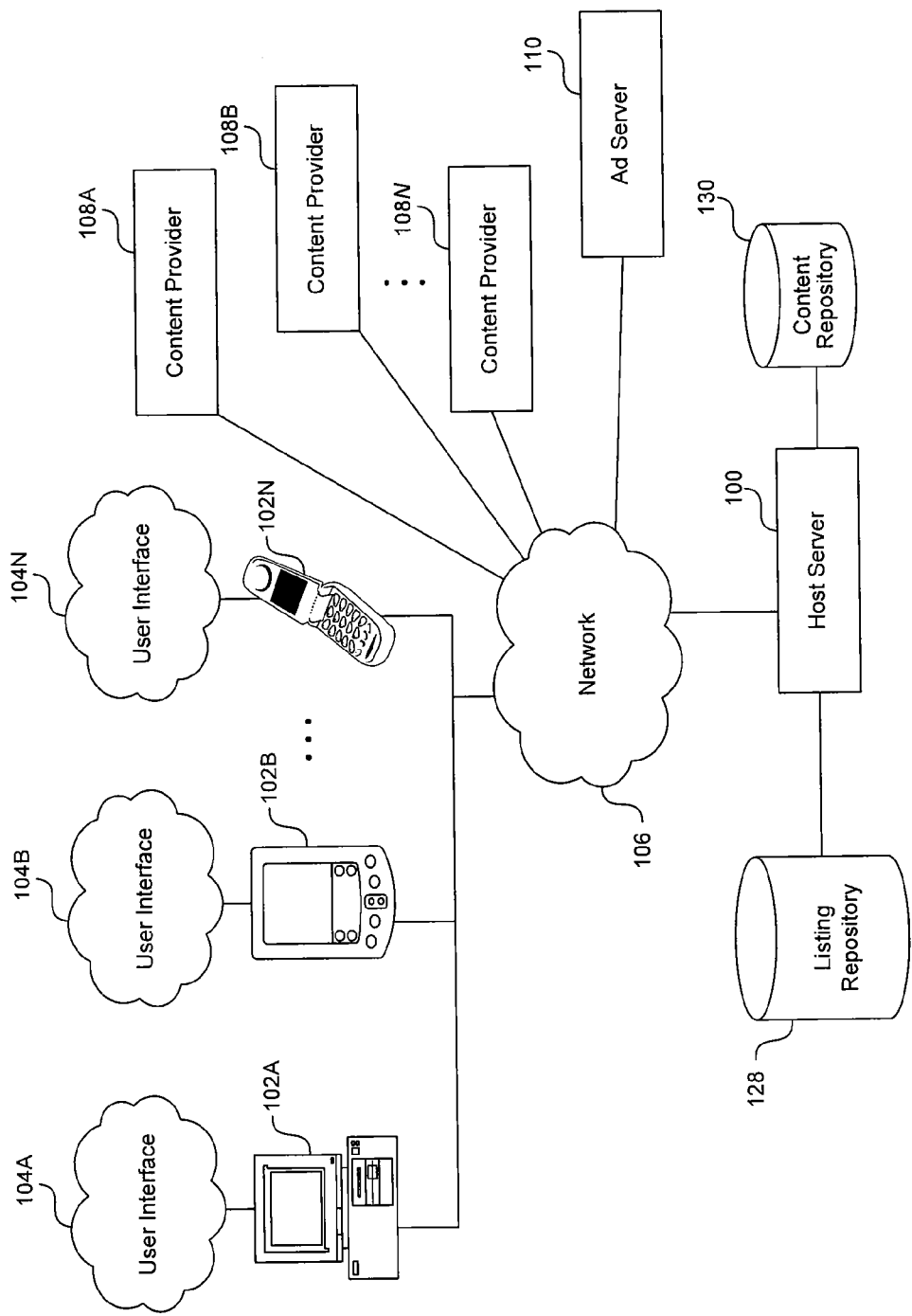
FIG. 1 illustrates a block diagram of client devices coupled to one another and a host server capable of aggregating web feeds relevant to a geographical locale from multiple sources and identifying trends in the web feeds.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for identifying trends in web feeds collected from various content servers.

FIG. 1 illustrates a block diagram of client devices 102A-N (where N is an integer) coupled to one another and a host server 100 capable of aggregating web feeds relevant to a geographical locale from multiple sources (e.g., content providers 108) over a network 106 and identifying trends in the web feeds.

The client devices 102A-N can be any system and/or device, and/or any combination of devices/systems that is able to establish a connection with another device, a server and/or other systems. The client devices 102A-N typically include display or other output functionalities to present data exchanged between the devices to a user. For example, the client devices and content providers can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, the client devices 102A-N are coupled to a network 106. In some embodiments, the client devices may be connected to one another.

The network 106, over which the client devices 102A-N couples may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and may appear as one or more networks to the serviced systems and devices. In one embodiment, communications to and from the client devices 102A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 106 broadly includes anything from a minimalist coupling of the components illustrated in the example of FIG. 1, to every component of the Internet and networks coupled to the Internet.

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client devices 102A-N can be coupled to the network (e.g., Internet) via a dial up connection, a digital subscriber loop (DSL, ADSL), cable modem, and/or other types of connection. Thus, the client devices 102A-N can communicate with remote servers (e.g., web server, host server, mail server, and instant messaging server) that provide access to user interfaces of the World Wide Web via a web browser, for example.

The listing repository 128 and/or the content repository 130 can store software, descriptive data, images, system information, drivers, and/or any other data item utilized by parts of the host server 100 for operation. The repositories 128 and 130 may also store user information and user content, such as, user profile information, user preferences, content information, network information, information/metadata about content sources, raw content, filtered content, etc. The repositories 128 and 130 may be managed by a database management system (DBMS), for example but not limited to, Oracle, DB2, Microsoft Access, Microsoft SQL Server, PostgreSQL, MySQL, FileMaker, MongoDB, CouchDB, Tokyo Cabinet, etc.

The repositories 128 and 130 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package. An example set of data to be stored in the repositories 128 and 130 is further described with reference to FIG. 2.

Figure 11:
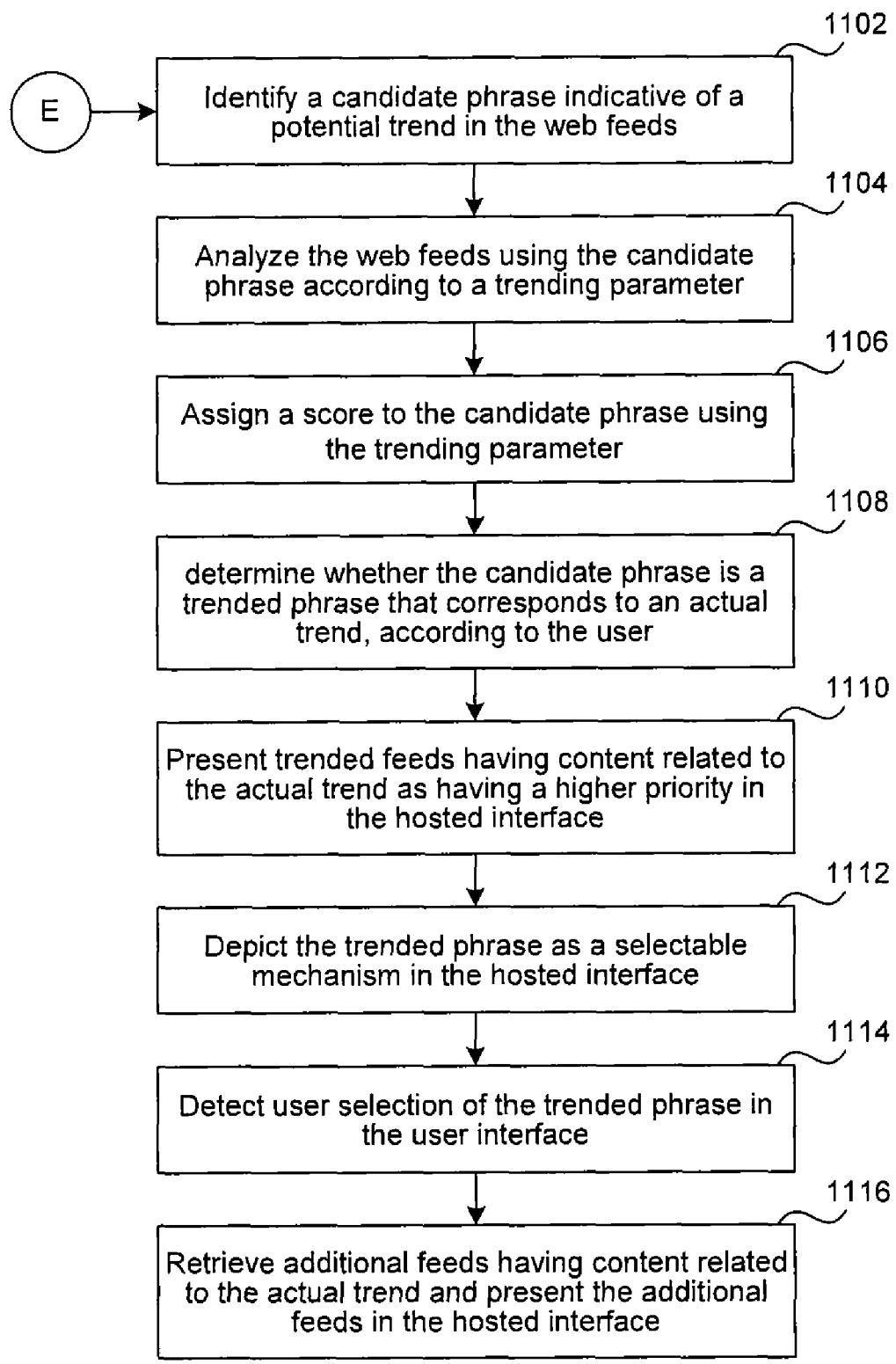
FIG. 11 depicts a flow chart showing an example process for using a scoring algorithm to determine whether a candidate phrase corresponds to an actual trend.

The host server 100 is, in some embodiments, able to communicate with client devices 102A-N and the content providers 108A-N via the network 106. In addition, the host server 100 is able to retrieve data from and/or store data in the repositories 128 and 130. The host server 100 can be implemented on a known or convenient computer system, such as is illustrated in FIG. 11. The host server 100 is described in more detail with reference to FIG. 2-3.

Figure 16:
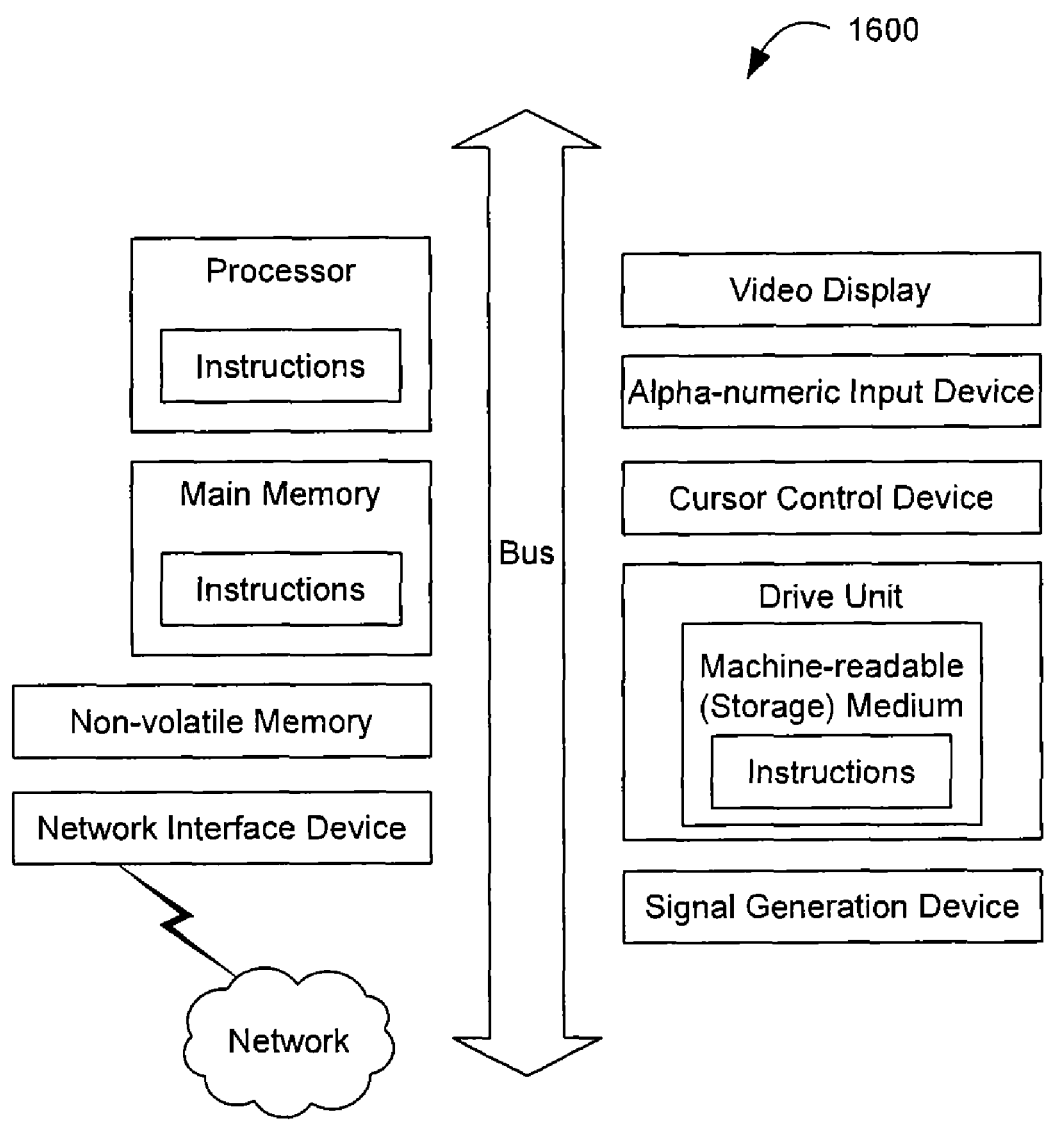
FIG. 16 shows a diagrammatic representation of a machine in the example form of a computer system within which a set of instructions, for causing the machine to perform any one or more of the methodologies discussed herein, may be executed.

The content providers 108A-N are coupled to the network 106. The content providers 108A-N can be implemented on a known or convenient computer system, such as is illustrated in FIG. 16. The content providers 108A-N can be a third party site, for example, including but not limited to, social networking sites, news sites, blogs, forums, etc. The content providers 108A-N have content (e.g., articles, images, movies, music, TV shows, feeds, news feeds, etc.) to be provided to users for access via a user interface provided by the host server 100. An example screen shot is illustrated with further reference to the example of FIG. 4.

There could be any number of content providers 108 coupled to the network 106 that meet these criteria. The content providers 108 make content available to appropriately configured clients coupled to the network 106. The content may have any applicable known or convenient form (e.g., multimedia, text, executables, video, images, audio, etc.), and may or may not be in appropriate form for delivery to a client through a browser (e.g., on web pages). Users of client devices 102 can access content (e.g., web feeds, news feeds), through any applicable known or convenient interface, from the content provider 108 through the host 100, which aggregates the web feeds from the multiple providers 108 and performs filtering.

In the example of FIG. 1, in operation, the host server 100 aggregates web feeds that are relevant to a geographical locale from multiple sources (e.g., content providers 108). The web feeds generally include news feeds that are temporally relevant to the time of access of the web site through which the news feeds are published. In addition, the web feeds are generally spatially relevant to a user's geographical location in real-time/near real time, or a user's specified geographical location.

The aggregation can be performed in a distributed fashion by multiple machines or engines within the host server 100. In this manner, each machine or engine is responsible for aggregating feeds from different sources (e.g., different content providers 108A-N) to aggregate feeds from more sources over a shorter period of time. Distributed aggregation using multiple machines can allow web feeds with time sensitivity (e.g., news feeds) to be aggregated in real time or near real time.

The host server 100 can, in one embodiment, analyze the web feeds (e.g., news feeds) and perform selective filtering to ensure that the published feeds are geographically relevant and/or temporally relevant. Moreover, filtering can also be performed to ensure the quality of the content or news content. For example, feeds with corrupt code (e.g., corrupt HTML code), feed data with broken links, out-of-date data, feeds with incomplete information can be removed and/or otherwise prevented from publication to a user. The host server 100 can also identify one or more images and/or selectively perform image filtering to publish an image with a published feed.

In one embodiment, the host server 100 identifies, from the aggregated feeds, trends. The trends that are identified may be specific to a local geographical locale or globally relevant. The trends may be identified by a phrase or word and depicted on the host interface. In some instances, the phrases or words that are associated with trends may be clickable or otherwise selectable, and when selected by a user, causes a search to be performed on the available web feeds for content relevant to the selected trend. The host server 100 can then present the search results on the host interface such that the user can access feeds relevant to the selected trend. The functions and features associated with the host server 100 are described with further reference to the examples of FIG. 2-3.

An ad server 110 may also be coupled to the network 106. The host server 100 can communicate with the ad server 110 to publish promotional content through the host user interface on which the aggregated news feeds are published. The host server 100 can place advertisements based on the content of the published news feeds and/or publish advertisements from partnerships with advertisers. For example, the host server 100 may publish certain ads as sponsored content for partnered advertisers.

Figure 2A:
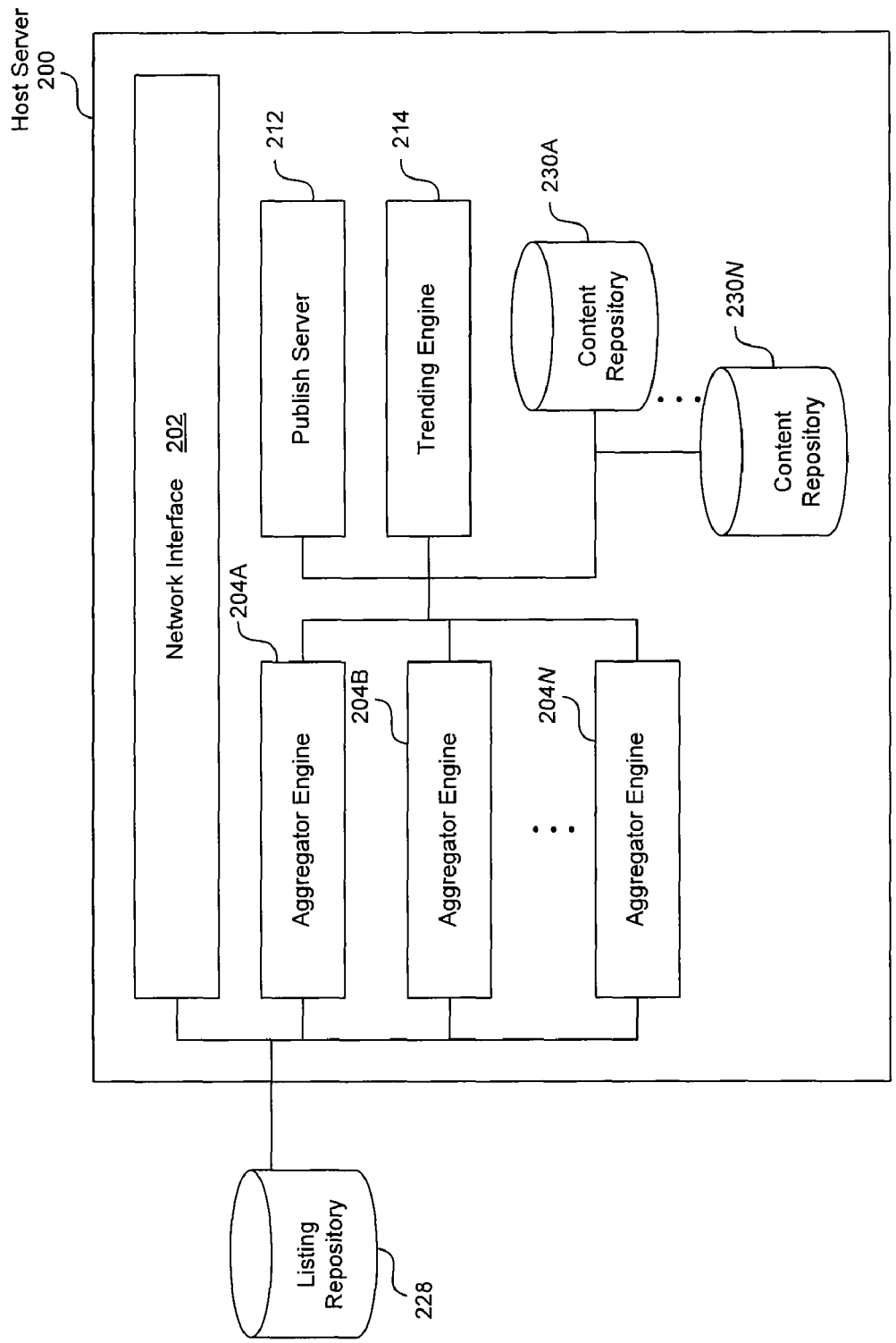
FIG. 2A depicts a block diagram illustrating a host server for aggregating web feeds relevant to a geographical locale and identifying trends.

FIG. 2A depicts a block diagram illustrating a host server 200 for aggregating web feeds relevant to a geographical locale and identifying trends.

In the example of FIG. 2A, the host server 200 includes a network interface 202, an aggregator engine 204, a publish server 212, and/or a trending engine 214. The host server 200 can include one, or more than one aggregator engine 204 as shown in the example. The aggregator engine 204 is further illustrated with reference to the example of FIG. 2B.

The host server 200 can include a listing repository 228 and/or a content repository 230. The host server 200 may be communicatively coupled to the listing repository 228 and/or the content repository 230 as illustrated in FIG. 2. In some embodiments, the listing repository 228 and/or the content repository 230 are partially or wholly internal to the host server 200.

In the example of FIG. 2, the network controller 202 can be one or more networking devices that enable the host server 200 to mediate data in a network with an entity that is external to the host server, through any known and/or convenient communications protocol supported by the host and the external entity. The network controller 202 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

A firewall, can, in some embodiments, be included to govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure. In some embodiments, the functionalities of the network interface 202 and the firewall are partially or wholly combined and the functions of which can be implemented in any combination of software and/or hardware, in part or in whole.

One embodiment of the host server 200 includes one or more aggregator engines 204. The aggregator engines 204 can be implemented, example, as software embodied in a computer-readable medium or computer-readable storage medium on a machine, in firmware, in hardware, in a combination thereof, or in any applicable known or convenient device or system. This and other engines described in this specification are intended to include any machine, manufacture, or composition of matter capable of carrying out at least some of the functionality described implicitly, explicitly, or inherently in this specification, and/or carrying out equivalent functionality.

The aggregator engines 204 can be any combination of hardware components and/or software agents able to aggregate web feeds from various sources using source metadata. Feeds can include by way of example but not limitation, RSS feeds, Atom, JSON, raw XML, etc. The aggregator engines 204 can use, for example, identifier information in the source metadata to identify the location of the web feed. For example, the identifier information can include a location identifier such as a URI or URL. In one embodiment, the aggregator engines 204 are coupled to the listings repository 228. The listings repository 228 can store listings of sources (e.g., content providers in the example of FIG. 1) from which content or feeds can be collected. The listings repository 228 can store, for example, in conjunction with source listings, source metadata.

Source metadata can include multiple fields, by way of example but not limitation, identifier information (e.g., location identifier (e.g., URL, URI, etc.), unique identifier, a short name, a pretty name), a geographical identifier with geographical information, etc. The geographical identifier typically corresponds to a geographical table having time zones, state, zip codes, airport IDs, etc. In addition, the source metadata can include a field for indicating whether the source is used in the aggregation (e.g., a field that indicates whether the source is active/non-active). In some embodiments, the source metadata can also include a field with a short description of the source, a URL construct field, a latitude field and a longitude field. The construct field is a URL mapping to include geographical locations identifiers in a URL. For example a URL with a geographical location identifier may be http://www.source.com%s->the % s can be associated with a geographical location (e.g., SF, LA, Seattle, etc.).

The latitude/longitude field can store the location of the actual story or referenced by the actual story. This is different form the geographical location field since the geographical location field typically corresponds to a region (e.g., city, state, neighborhood, etc.) rather than a specific point such as that referenced by longitude/latitude data points. The data in the latitude/longitude field can be used and checked against the geographical location to verify that the story is relevant to the geographical location (e.g., the longitude/latitude is within a specific distance compared to the geographical location).

Figure 2B:
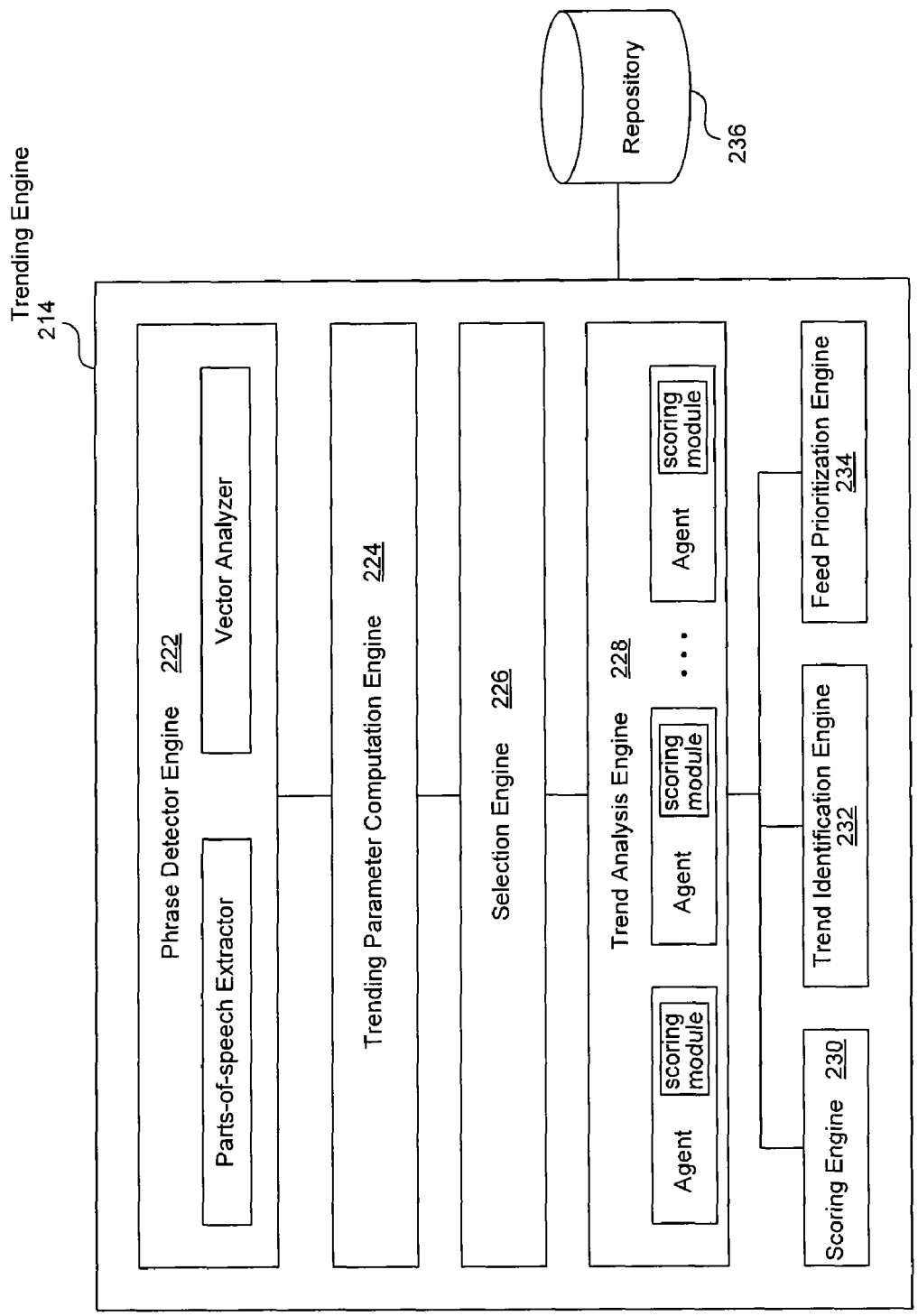
FIG. 2B depicts a block diagram of the trending engine in the host server.

In one embodiment, the source metadata includes mapping information which specifies a data structure. For example, the aggregator engines 204 can parse the collected web feed according to mapping information contained in the source metadata. In this manner, the aggregator engines 204 can generate the normalized web feeds that have a consistent data structure specified by the mapping information. In one embodiment, the aggregator engine 204 includes a normalizer module as shown in the example of FIG. 2B, which normalizes the web feeds into a particular data structure (e.g., the data structure specified by the mapping information).

The data structure specified in the mapping information typically includes multiple fields, including but not limited to, a unique ID for a story, a title for the story, a link to an image (e.g., a location identifier for an image), one or more tags, a video link, a summary field for the story, unassigned fields, a field to specify the author, a link (e.g., a URL to the story rather than the source), a field with information used for ranking, a field with a date (e.g., the date the story or feed was published/drafted), a field for the source name, geographical data.

In addition, the data structure can include a field to specify a source identifier, a time stamp (e.g., to indicate when the story/feed was aggregated), a geographical identifier, an address identifier (e.g., an address included with the source), a story rank, a field to indicate whether the story has been published or not, a short name of the source, a topic identifier to specify the category, and/or a field to specify whether the story is active or not. The data structure can also include fields where popularity or trending information can be stored. For example, a field can be used to indicate number of clicks that the story has received, etc.

Note that the normalization into the data structure can be performed by automatically crawling the web feed and analyzing each field. For example, the crawler can use a probabilistic model in assigning fields in the web feed into the data structure specified by the mapping information. In one embodiment, certain tags in a web feed can be determined to correspond to specified fields in the normalized data structure approximately a certain percentage of the time. The percentage can be determined based on collecting statistical information. For example, the tag 'summary' in the feed may be determined to correspond to the summary field in the normalized data structure ~60% of the time or the tag 'description' may correspond to the summary field ~40% of the time. Such a probabilistic model can be used to automatically map feeds to the normalized data structure.

In addition, heuristics can be used to perform the mapping. For example, if the web feed only has a single field with textual data, then that field is mapped to the title field in the normalized data structure. If there are two fields with text, then the larger is typically the summary and the shorter is typically the title. A field with an URL can be mapped to a link field in the normalized data structure, for example.

In one embodiment, a human editor performs some or all of the mapping to generate the normalized web feed, for example by clicking on links in a feed/story, determining whether the story is local, evaluating whether the story is interesting, etc. The automated crawler can be used in conjunction with human editing for the mapping into the normalized data structure.

One embodiment of the host server 200 includes multiple aggregator engines 204A-N. In this instance, each of the multiple aggregator engines 204A-N is assigned a subset of the sources listings. Each aggregator then collects the web feeds from the assigned sources using the information contained in the listings repository. The listings can be assigned to the aggregator engines 204A-N such that the load is balanced (e.g., each aggregator 204 is assigned an approximately the same number of listings from which web feeds are collected). Moreover, the aggregators 204 store the data in a local cache for future use such that data that has already been fetched need not be obtained again to conserve bandwidth usage. Therefore, the aggregators 204 store data in cache such that only new data is collected from the sources.

The aggregator engine 204 can determine the geographical locale that is relevant to the web feed. The aggregator engine 204 can parse through the normalized web feed (e.g., in the title, summary, the article itself, or other portions of the web feed) to detect location key words. Location keywords can be any words which may indicate the presence of an address or other type of location identifier. For example, location keywords can include, 'St./Street', 'Dr./Drive', 'Blvd./Boulevard', 'th', 'ln./lane', etc. Keywords to detect can also include 'at', 'on', 'near', 'in', 'close to', 'in proximity', etc. Using, the location keywords, the aggregator engine 204 can identifying an address referenced in the normalized web feed.

For example, in an article, if the aggregator engine 204 detects the following location keywords "happened at 3rd St. and Market St. in San Francisco", the engine 204 can extract the address "3rd", "Market", and "San Francisco". The aggregator engine 204 can thus lookup the extracted address in a text file or via a third party mapping/location service (e.g., Google Maps), for example, to obtain geographical data such as, GPS coordinates, longitude/latitude data set, etc. Such geographical data can be used to determine the geographical locale (e.g., which may be a neighborhood, a city, a county, a state, a province, a region, etc.). In some instances, the aggregator engine 204 includes a geo-locator that determines the location or a relevant locale to the web feed.

In one embodiment, the aggregator engine 204 performs filtering on the normalized web feed to determine whether the normalized web feed includes qualified content for publication. The aggregator engine 204 can include a filter module and performs one or more of the filtering procedures. The filtering performed can include one or more processes performed in parallel or in sequential order.

For example, the aggregator engine 204 can determine content/stories in the normalized web feed with obscenities or profanities. Content with identified obscenities or profanities are typically disqualified from publication to a user. In addition, the engine 204 can identify ad links in the normalized web feed. Generally, the content/story with an ad link is also disqualified from publication. In one embodiment, the disqualified content is retained in the cache such that it does not get aggregated again in the future. In addition, disqualified content is typically not retained in storage. In one embodiment, the ad detection is performed after the filtering for obscenities or profanities. Ad detection may also be performed prior to filtering out content with obscenities or profanities.

The aggregator engine 204 can identify content/story in the normalized web feed with corrupt data (e.g., corrupt HTML code or broken links) or unrecognizable characters, for example, to clean up the content to generate a valid feed for publication. The corrupt data is typically salvaged or removed. For example, if the summary is partially corrupt, then the corrupt portions may be discarded. In some instances, if the title is corrupt and cannot be salved, then the story may be removed. In addition, the aggregator engine 204 removes JavaScript before publication. In one embodiment, the aggregator engine 204 extracts timing data (e.g., in a timestamp) from the normalized web feed and uses the timing data to determine whether the web feed includes content that is temporally relevant.

Moreover, the aggregator engine 204 can identify an image to be associated with a published web feed. One embodiment of the aggregator engine 204 includes an image detector/filter module can perform some or all of the image identification and association processes. The image is generally published on a user interface as being associated with the web feed/qualified content. The image can be identified from the normalized web feed itself, for example, using a link to an image contained in the normalized web feed. If the normalized web feed does not include an image or a link to an image, the aggregator engine 204 searches for content that were removed in the filtering process for any images.

An additional image filtering process can be performed by the aggregator engine 204 as well. For example, the extracted images can be further filtered for ads, junk icons, banner ads, etc. The image filter can be applied using dimensions of the images to determine presence of advertisements or icons in the images. In addition, the aggregator engine 204 can perform character recognition to detect text in the images to determine presence of advertisements in the images to be removed, for example. In one embodiment, the aggregator engine 204 goes to the link to the content/story in the web feed and scrapes the HTML for images to search for images to publish with the feed. The images thus detected can be filtered using image filters as well. In one embodiment, the aggregator engine 204 stores the filenames of extracted images and uses frequently occurring filenames as filters. For example, names that occur frequently (e.g., ad.jpg) may be an indicator that the image is an icon or an ad.

One embodiment of the host server 200 includes one or more content repositories 230A-N. The qualified content/stories/feeds and associated images thus obtained are stored by the aggregators 204 in the content repository 230A. In some embodiments, the host server 200 includes multiple content repositories 230A-N to store the feeds or valid/qualified stories redundantly. For example, each of the multiple content repositories 230A-N can be individually coupled to all of the multiple aggregator engines 204 such that each repository 230 stores all the content aggregated and processed by each of the aggregators 204. Multiple redundancies ensure that in the event that a repository malfunctions, the remaining repositories stores additional copies of the same data. In addition, with more repositories, more simultaneous connections can be supported to ensure real time or near real time content delivery to end users.

One embodiment of the host server 200 includes a publish server 212 coupled to the one or more content repositories 230A-N. The publish server 212 can be implemented, for example, as software embodied in a computer-readable medium or computer-readable storage medium on a machine, in firmware, in hardware, in a combination thereof, or in any applicable known or convenient device or system. The publish server 212 can be any combination of hardware components and/or software agents able to publish the qualified stories accessible to a user through a user interface.

Figure 9:
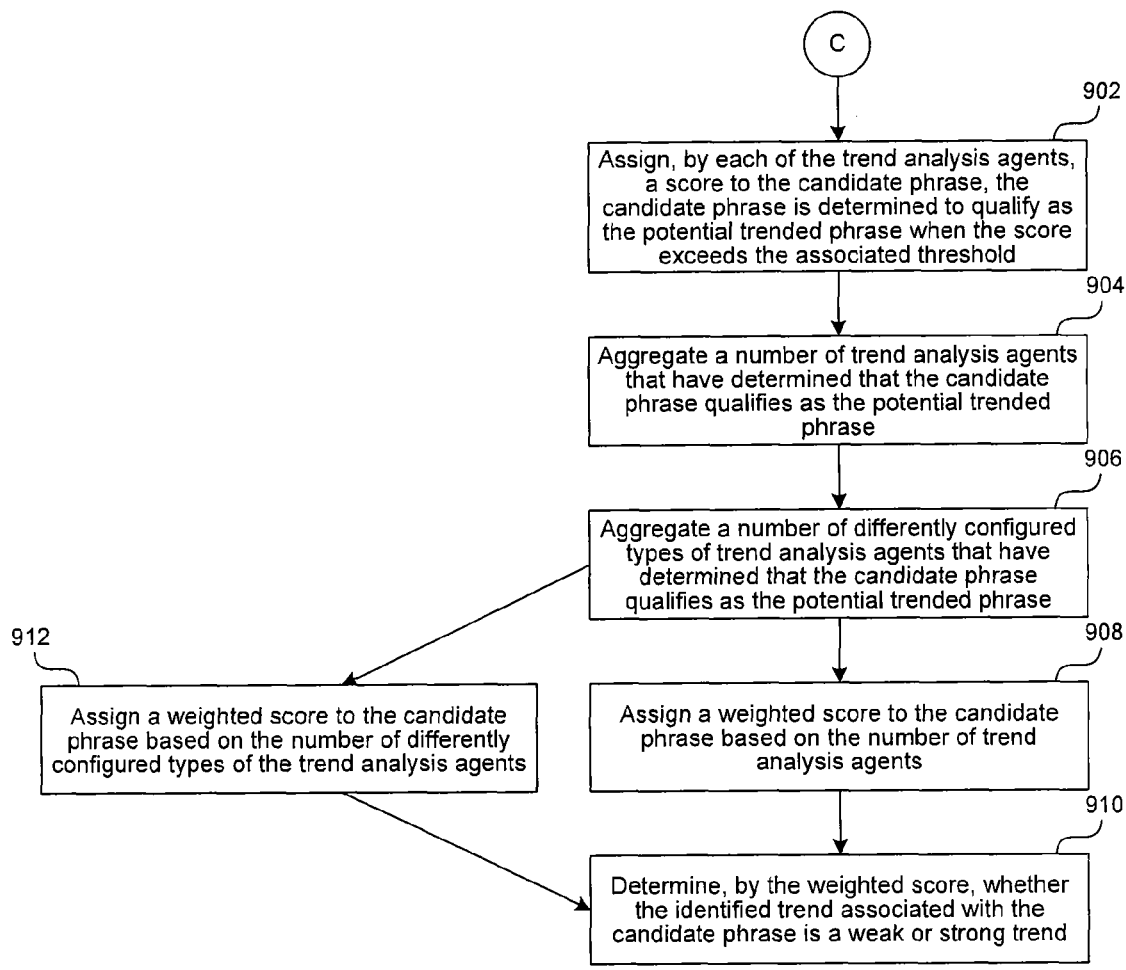
FIG. 9 depicts a flow chart showing an example process for using weighted scores to determine whether an identified trend is weak or strong.

The publish server 212 typically publishes the stories in a user interface in a manner such that the stories are shown to be relevant to a particular geographical locale. An example of a user interface showing news feeds relevant to a particular locale is shown in FIG. 9. Each user can be associated with a default geographical locale which is reconfigurable by the users. Example features in the user interface is described with further references to the examples of FIG. 9-14.

In addition, the publish server 212 publishes stories or feeds as being associated with an image. The image is also retrieved from one or more of the repositories 230A-N and has typically been filtered to eliminate ads and icons. When the user selects a different locale, the publish server 212 communicates with the repositories to obtain an updated set of stories/feeds that are relevant to the selected locale. Generally, the published feeds/stories include temporally relevant content (e.g., news feeds for publishing in real time or near real time). Thus, the publish server 212 establishes communications periodically with the repositories 230 to retrieve updated sets of feeds that have been aggregated by the aggregator engines 204.

In one embodiment, the publish server 212 labels published feeds as having been published already so it does not get published again. In general, the aggregators continuously or periodically aggregate content. For example, the aggregators can collect feeds periodically (e.g., after a predetermined amount of time, every 2 minutes, every 5 minutes, every 10 minutes, etc.). The publish server 212 then retrieves recent content (e.g., temporally relevant content) from the repositories 230 and publishes them.

In one embodiment, the publish server 212 performs fuzzy matching on titles of feeds to be published and feeds that have been published to detect similar content that has previously been published. For example, fuzzy matching (e.g., Levenshtien distance) can be performed on feed titles to detect content which may be previously been published.

In general, the publish server 212 retrieves each distinct feed/story once. The publish server 212 can determine whether a story has previously been retrieved for publication by performing a comparison using the normalized feeds since they are of a uniform data structure. Moreover, the publish server 212 can determine the publication time of the content/feed and the aggregation time (e.g., when the feed/content was processed and aggregated by the aggregator engines 204) to determine whether the feed/content is still up to date and temporally relevant.

One embodiment of the host server 200 includes a trending engine 214 coupled to the publish server 212. The trending engine 214 can be implemented, for example, as software embodied in a computer-readable medium or computer-readable storage medium on a machine, in firmware, in hardware, in a combination thereof, or in any applicable known or convenient device or system. The trending engine 214 can be any combination of hardware components and/or software agents able to determine trending data of content or web feed.

The trending engine 214 can data mine trending data of web feeds or selected qualified content. The trending data can be used by the publish server 212 to prioritize placement of feeds or content in the user interface. For example, content or feeds that are more popular or contain trendy content/information are typically shown before less popular content in the user interface. The trending data can include global trends and/or local trends. For example, the trending engine 214 can collect global trending data from third party sites (e.g., Google trends, Twitter trends), social networking sites (e.g., MySpace, Facebook), etc. Trending data can also include user trends, determined by the trending engine 214 by, for example, logging user action and clicks to find the top read/accessed stories to identify what might be popular and when it is popular.

In one embodiment, the trending engine 214 identifies trends using one or more trending parameters. The trending engine 214 uses multiple trending analysis agents each configured to analyze a candidate phrase using a different trending parameter to facilitate in making a determination as to whether the candidate phrase corresponds to a topic that is popular among feeds in locally or globally.

The trending engine 214 can select the candidate phrases using any known or convenient method. For example, the trending engine 214 selects the candidate phrases using parts-of-speech analysis. In another example, the trending engine 214 selects the candidate phrases using matrix analysis performed on terms that have a combination of a high term occurrence frequency in a single document and a high document occurrence frequency (term that occurs among many documents). The features related to using trending analysis agents to identify trends using candidate phrases are described with further reference to the example of FIG. 2B.

In one embodiment, the trending engine 214 computes the probability that a feed item would become popular, would remain popular, or whether an online user will share the feed item with another online user. For purposes of illustration, the term popularity, as described herein, refers to any online user action concerning a particular feed item. For example, a user sharing a feed item with another user contributes to that feed item's popularity. In other instances, a user tagging a particular feed item, or providing a rating on a particular feed item contributes to that particular feed item's popularity. In other instances, the user's mention of the feed item in, for example, online polls, contributes to the feed item's popularity. It is noted that the term popularity is not confined to positive reviews or favorable feedback of a particular feed item. Any mention or rating of a feed item, regardless of whether it is favorable or not, contributes to the popularity factor.

Figures 15A, 15B:
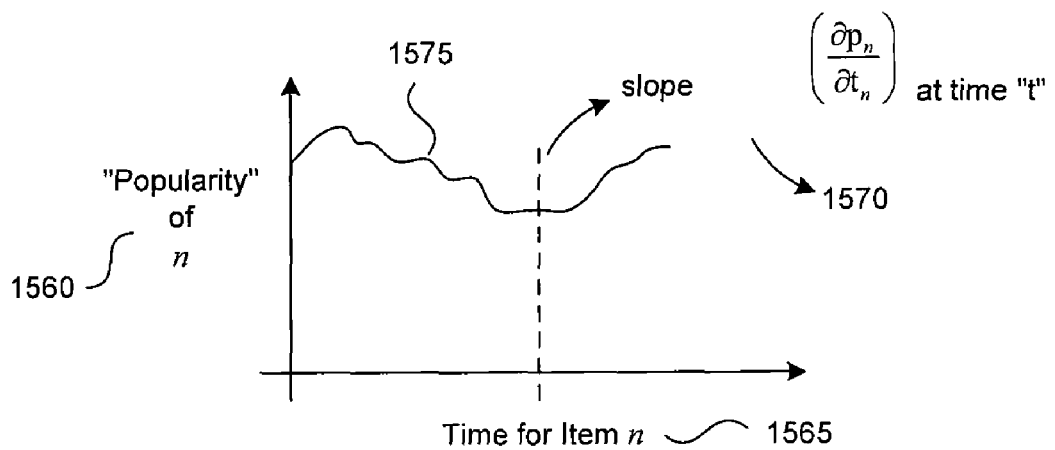
FIG. 15A depicts an example of a table used for tracking popularity information of feed items over periods of time.
FIG. 15B depicts an example of a graph of the popularity information for identifying trends.

The trending engine 214 can populate the feed items in a table or a matrix to perform further prediction operations. An example of such a table is shown in FIG. 15A. In this example illustrated in FIG. 15A, the feed items 1500 and popularity of feed items at different time instances 1502 are tabulated. In one embodiment, feed items 1 through n 1520 are tabulated against time instances at five minute increments 1504. The numbers within the table 1506 correspond to the popularity of the particular feed item at different time instances.

After populating the feed item table as illustrated in the embodiment above, the trending engine 214 computes the graph trends for each of the feed items. One example of such a graph is illustrated in FIG. 15B. Here, the popularity of a particular feed item (n in this example) 1560 is plotted at different time instances 1565. The slope of the graph is then computed for each feed item by doing a differential operation on the graph of each feed item, and example of which is indicated in 1570. By comparing the differential value (or slope) of the graph at a particular time instance, and comparing that value against one or more prior time instances, the trend of the particular feed item is predicted. The trend prediction is then used in at least one of three ways.

In one embodiment, the predicted trend is used to determine whether a particular feed item is currently a "fad". The term fad refers to the gaining popularity of a particular feed item, and can be determined by using any number of means known to people skilled in the art. In another embodiment, the predicted trend is used to determine the probability that a particular feed item will become a fad within a certain time period. In yet another embodiment, the predicted trend is used to determine the probability that a current "fad" item will likely remain a fad item within a predefined time period.

The components of the host server 200 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the host server 200 without deviating from the spirit of the disclosure.

FIG. 2B depicts a block diagram of the trending engine 214 in the host server.

The trending engine 214 includes, in one embodiment, a phrase detector engine 222, a trending parameter computation engine 224, a selection engine 226, a trend analysis engine 228 having multiple trend analysis agents, a scoring engine 230, a trend identification engine 232, and/or a feed prioritization engine 234. Note that additional or less modules can be included without deviating from the spirit of the novel disclosure.

One embodiment of the trending engine 214 includes a phrase detector engine 222. The phrase detector engine 222 can be implemented, for example, as software embodied in a computer-readable medium or computer-readable storage medium on a machine, in firmware, in hardware, in a combination thereof, or in any applicable known or convenient device or system. The phrase detector engine 222 can include any combination of hardware components and/or software agents able to select, identify, detect, or retrieve candidate phrases which may correspondence to a potential trend from web feeds.

The phrase detector engine 222 can select or detect phrases using any known and/or convenient technique. For example, the phrase detector engine 222 can mark a phrase (e.g., term, word, group of words, a part of a sentence) as being potentially corresponding to a trend (e.g., popular content, popular topic, etc.) if it detects over a certain number of the same phrase in a pool of feeds. The phrase detector engine 222 can identify candidate phrases by detecting phrases that occur in over a certain percentage of all feeds, or phrases that comprise of a certain percentage of all words in a particular feed, for example. In addition, the phrase detector engine 222 can select candidate phrase that may correspond to local or global trends. For example, the phrase detector engine 222 can identify a candidate phrase as potentially corresponding to a global trend if the phrase or term occurs in feeds relevant to certain number different geographical locales or certain percentage of all geographical locales.

In some instances, the candidate phrases are detected from the title and/or the summary of a web feed. In addition, the candidate phrases can be detected from the entire feed. In one embodiment, the detector engine 222 selects a candidate phrase based on the parts-of-speech of a word. For example, the word/phrase may be selected as a candidate if it is, a gerund, a infinitive, a proper noun, and a noun-verb clause. One embodiment of the phrase detector engine 222 includes a parts-of-speech extractor which can detect the parts-of-speech of words and phrases in an article or feed and identify the word and/or phrase as a candidate phrase based on the parts-of-speech.

In one embodiment, the phrase detector engine 222 selects candidate phrases by performing vector analysis and factorization on a matrix. The matrix is typically constructed using words/phrases that occur frequently in a single feed or across multiple feeds (e.g., in the title, summary, and/or entire article/document). For example, the phrase detector engine 222 can generate a concatenation of a title and a summary of web feeds to compute the term frequency (e.g., the occurrence of terms in the concatenation). Using the term frequency, the phrase detector engine 222 can then use the term frequency to identify a pool of candidate phrases. In one embodiment, the engine 222 removes numbers and short words from the concatenation before computing term frequencies.

To select the words/phrases from the pool of candidate phrases to construct the matrix, the detector engine 222 can, for each of the pool of candidates, determine the number of documents across which occurrence is detected. The detector engine 222 can thus select the candidate phrases from the pool based on the number of documents. For example, the detector engine 222 can select the pool of candidate phrases having a term frequency exceeding a certain number or having a term frequency in the top x %. The detector engine 222 can then filter each of the pool of candidate phrases using the document occurrence frequency. For example, the phrases having a document frequency exceeding a certain number or having a term frequency in the top y % of the pool can be selected to construct as candidate phrases.

Term frequency and document frequency can be used to filter words and/or phrases. For example, if a particular word/phrase appears in most or all document (e.g., words like 'the', 'a', 'an', 'of', etc.), it may be eliminated from being a candidate word/phrase. If a word/phrase is in one or few documents, then the word/phrase may be eliminated as well since it is too rare to be a possible features.

In one embodiment, the phrase detector engine constructs a matrix with elements that correspond to the term frequency of phrases cross feeds. The matrix can also be constructed with the term frequency of words in addition to or in lieu of phrases. For example the matrix can depict the term frequency of occurrence of each of the pool of candidates in each story identified by the story identifiers. An example of such matrix is illustrated in FIG. 6 (e.g., matrix 'V'). The phrase detector engine 222 can factorize the matrix to extract the candidate phrases from the pool of candidates. The factorization can be performed using non-negative matrix factorization, singular value decomposition, or any other optimization based solution such as a genetic algorithm, simulated annealing, etc. In one embodiment, the engine 222 extracts features in the feeds (e.g., news) by performing non-negative matrix factorization. One embodiment of the phrase detector engine 222 includes a vector analyzer which can perform the factorization and/or construct matrices on which factorization are performed.

One embodiment of the trending engine 214 includes a trend parameter computation engine 224. The trend parameter computation engine 224 can be implemented, for example, as software embodied in a computer-readable medium or computer-readable storage medium on a machine, in firmware, in hardware, in a combination thereof, or in any applicable known or convenient device or system. The trend parameter computation engine 224 can include any combination of hardware components and/or software agents able to identify, extract, compute, and/or otherwise determine the value of a trending parameter for phrases or words.

The trending parameter computation engine 224 ("computation engine 224") can determine the term frequency of occurrence of words or phrases in a web feed (e.g., in the title, in the summary, in the entire document, and/or in the concatenation of the title and summary). For example, the computation engine 224 can compute the total number of times a certain word or phrase occurs in a document or in a certain portion of a feed or document. The term frequency, in some instances, may correspond to how popular a particular topic is among documents or feeds and can be computed and tracked by computation engine 224 to identify trends or potential trends. One embodiment of the computation engine includes a term frequency computation engine (e.g., the term frequency computation engine 302 in the example of FIG. 3) which can determine the term frequency of various phrases or words.

In addition, the computation engine 224 computes or otherwise determines the number of documents or feeds across which occurrence of a term, phrase, word, or portion of a sentence is detected. The computation engine 224 can detect the term in the title, summary, the feed, or a portion of the feed. Occurrence of terms, phrases, and/or words in documents can indicate popularity of a particular topic. In one embodiment, since documents or feeds are associated with geographical locales, by determining the feeds or documents across which a particular term/phrase exists and the associated locale, it is possible to detect whether a trend or popular topic is local or global. In addition, the locale within which the topic is popular can be determined by tracking document frequency. One embodiment of the computation engine 224 includes a document frequency computation engine (e.g., the document frequency computation engine 304 in the example of FIG. 3) which determines the number of documents.

In one embodiment, the computation engine 224 determines the time occurrence frequency of a phrase or word. The time occurrence frequency can be computed to determine how frequently the phase or word has occurred in documents (or certain portions of documents such as the title and/or summary) over a period of time. In some instances, the time occurrence frequency for one time period can be compared to that for another time period to determine how the frequency of occurrence for a word/phrase has changed over time. This metric maybe an indicator for how quickly a topic became popular or unpopular and may be used to identify fads in addition to detecting trends. One embodiment of the trending parameter computation engine 224 includes a time occurrence frequency tracker (e.g., the tracker 306 in the example of FIG. 3) that tracks and computes the time occurrence frequency.

The computation engine 224 tracks clicks and determines the click occurrence frequency for terms, words, and/or phrases. The click occurrence can be computed by tracking clicks on stories or feeds. One embodiment of the trending parameter computation engine 224 includes a click rate tracker (e.g., the click rate tracker 308 in the example of FIG. 3) that tracks and computes the click rate.

Figure 3:
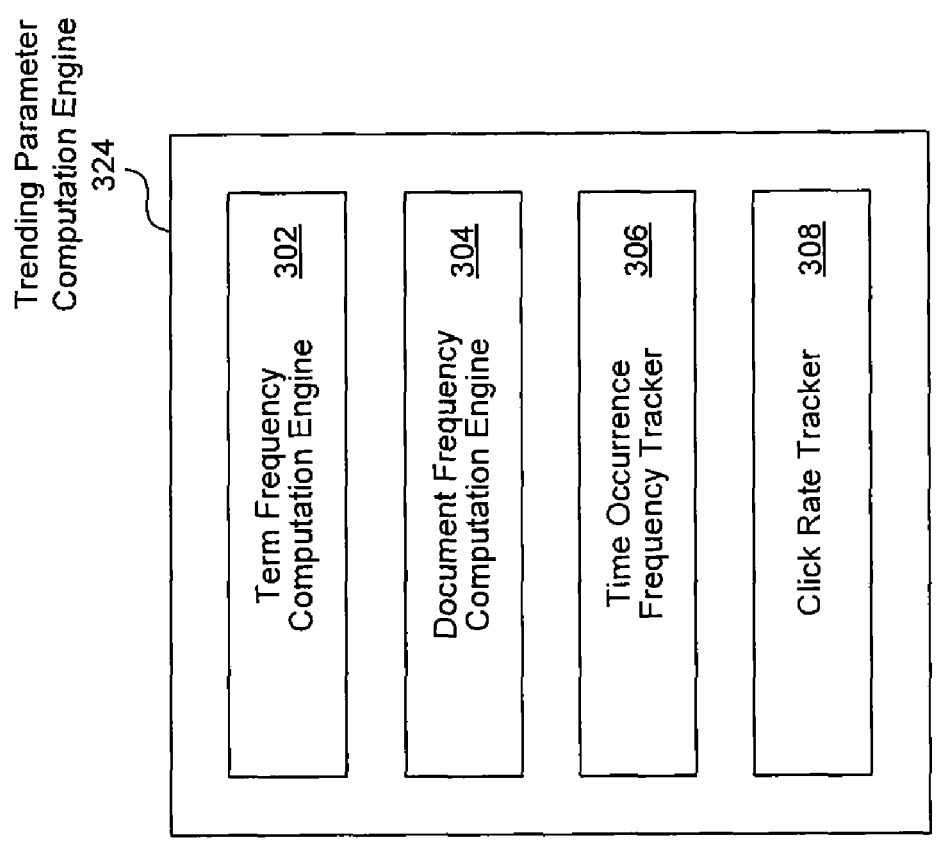
FIG. 3 depicts a block diagram of the trending parameter computation engine of the trending engine.

The trending parameter computation engine 224 ("computation engine 224") can include additional engines/modules and is illustrated with further reference to the example of FIG. 3.

One embodiment of the trending engine 214 includes a selection engine 226 coupled to the phrase detector engine 222. The selection engine 226 can be implemented, for example, as software embodied in a computer-readable medium or computer-readable storage medium on a machine, in firmware, in hardware, in a combination thereof, or in any applicable known or convenient device or system. The selection engine 226 can include any combination of hardware components and/or software agents able to select the candidate phrase or word from a pool of phrases (e.g., the phrases or words identified by the phrase detector engine 222).

In some instances, the candidate phrases are selected by the phrase detector engine 224. Alternatively, the selection engine 226 selects the candidates using the trending parameters determined by the trending parameter computation engine 224. For example, the selection engine 226 can identify the term frequency, document frequency, time occurrence frequency, and/or click rate from the computation engine 324 and make a selection based on any one or a combination of these metrics.

One embodiment of the trending engine 214 includes a trend analysis engine 228 coupled to the selection engine 226. The trend analysis engine 228 can be implemented, for example, as software embodied in a computer-readable medium or computer-readable storage medium on a machine, in firmware, in hardware, in a combination thereof, or in any applicable known or convenient device or system. The trend analysis engine 228 can include any combination of hardware components and/or software agents able to analyze web feeds to identify fads, trends, or other types of 'popular' topic or content.

The trend analysis engine 228 can analyze the web feeds using trending parameters to determine whether candidate phrases correspond to trends. For example, the trend analysis engine 228 can communicate with the computation engine 224 to determine the values for the parameters for use in identifying trends by analyzing candidate phrase. For example, the analysis engine 228 can include multiple trend analysis agents each of which can analyze candidate phrases using a trending parameter. The candidate phrases can be assigned to the analysis agents who can analyze the assigned phrases using a configured type of trending parameter (e.g., term frequency, document frequency, time occurrence frequency, and/or click rate, etc.).

For evaluation purposes, the candidate phrase is typically assigned to an agent of a passive state (or, "first state"). The passive state (or "first state") refers to the state in which the agent has not yet evaluated a candidate phrase whereby a threshold has been met and the active state (or "second state") refers to the state in which the agent has evaluated a phrase and has met an evaluation threshold. Generally, there is a different threshold associated with different types of trending parameters. The agent can generate a score (e.g., via the scoring module) based on a configured type of trending parameter and for comparison with the threshold. Multiple phrases can be assigned to each of the multiple agents in the first passive state. The agents can then determine whether the assigned candidate phrase meets an associated threshold to qualify as a potential trended phrase which corresponds to a trend or otherwise popular topic.

The collective states of agents (e.g., whether the agents are in the passive or active state) and the words or phrases that they became active evaluating are used to identify trended phrases which correspond to trends. Once the candidate phrases have each been assigned to agents and have been evaluated, the process proceeds as follows. For a first agent that has evaluated a phrase/word and reached the evaluation threshold (e.g., of a second state), the trend analysis engine 228 selects another agent and determines whether the selected agent is also in the second state. If so, the engine 228 determines whether the selected agent reached threshold analyzing the same phrase/word as the first agent. If so, the first agent is deactivated back to the first state.

Figure 5:
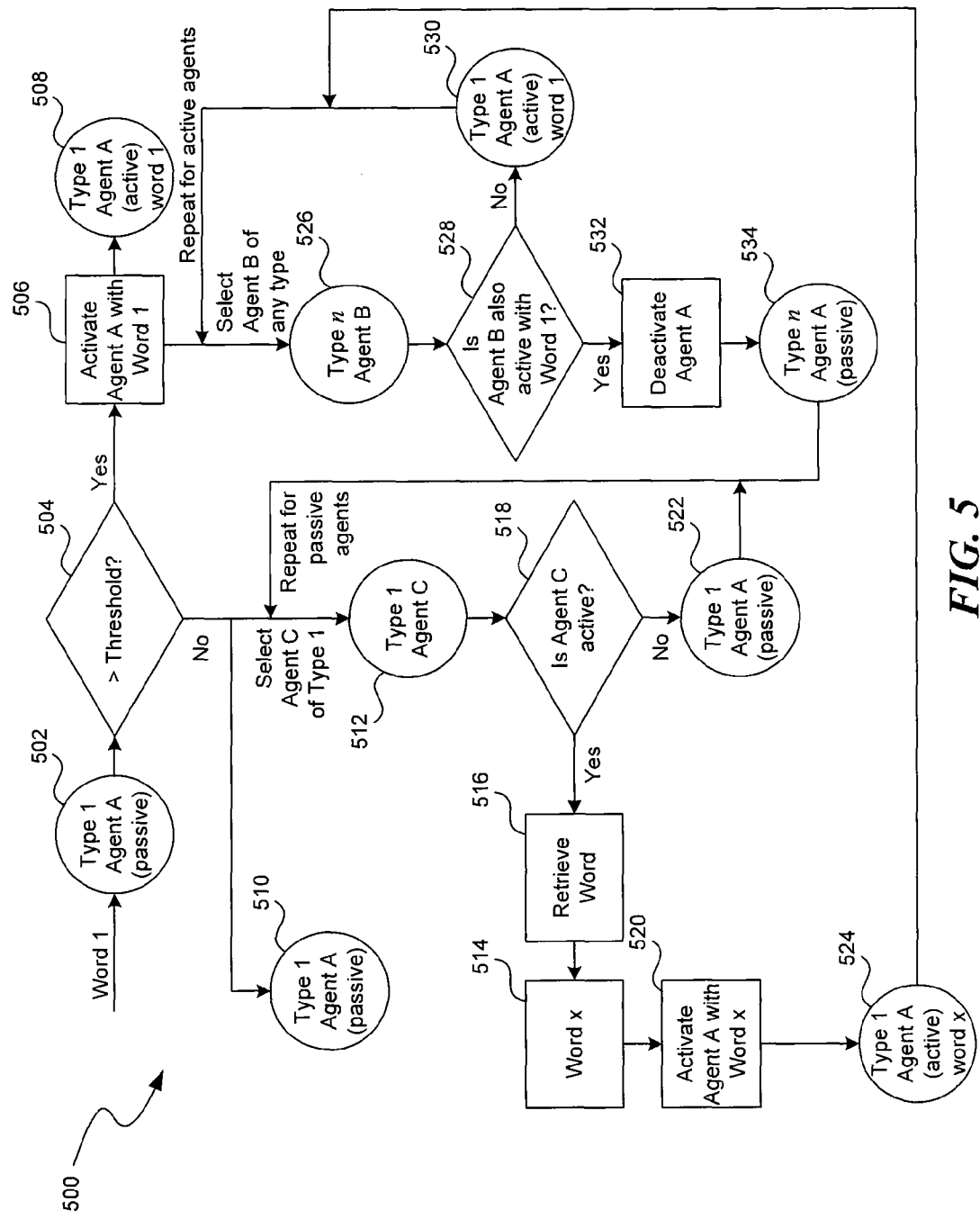
FIG. 5 illustrates an example of a flow diagram showing a process for using trend analysis agents configured with different trend analysis parameters to detect trends.

This process is further illustrated diagrammatically in the example of FIG. 5. The down-weighting allows negative feedback looping to mitigate the effect of false positives. Since the probability that an active agent contacts an agent evaluating the same word/phrase increases with cluster size, the down-weighting keeps groups from growing too fast and activating more agents than needed.

For a second agent that has evaluated a phrase/word and remains in the first state (e.g., has not reached evaluation threshold), the analysis engine 228 selects another agent which is configured to use the same trending parameter for analysis as the second agent. The analysis engine 228 can detect whether the selected agent has reached evaluation threshold and if so, the engine 228 changes the state of the second agent to an activated state (e.g., second state). Furthermore, the analysis engine 228 can detect the candidate phrase/word (e.g., or "hypothesis") which the selected trend analysis agent reached evaluation threshold with and such word/phrase is also assigned to the second agent such that the second agent is now in active same with the same phrase/word. However, if the selected agent also has not reached evaluation threshold, the state of the second agent is also maintained in the first state (inactive state).

This process can be repeated for all agents and is illustrated diagrammatically in the example of FIG. 5. A candidate phrase can be identified as a trended phrase based on the number or percentage of trend analysis agents that are active with the phrase/word (e.g., having reached threshold in the second state). The agents may have reached the active state through analyzing the phrase or through assignment based on the state of a neighboring agent.

One embodiment of the trending engine 214 includes a scoring engine 230 coupled to the trend analysis engine 228 and/or the trend identification engine 232. The scoring engine 230 can be implemented, for example, as software embodied in a computer-readable medium or computer-readable storage medium on a machine, in firmware, in hardware, in a combination thereof, or in any applicable known or convenient device or system. The scoring engine 230 can include any combination of hardware components and/or software agents able to weight the scores for a candidate phrase based on collective states of trend analysis agents in the trend analysis engine 228.

For example, the scoring engine 230 can determine a number or percentage of trend analysis agents that determines that the candidate phrase qualifies as the potential trended phrase, or the number or percentage of agents that have reached evaluation threshold (e.g., in a second state). Additionally, the scoring engine 230 can determine the number of differently configured types of trend analysis agents that determined that the candidate phrase qualifies as the potential trended phrase. Since the agents can be configured to analyze phrases using term frequency, document frequency, term occurrence frequency, click rate or other metrics, for example, candidate phrases with more agents of differing types that have reached threshold may typically correspond with stronger trends.

In one embodiment, the scoring engine 230 assigns a weighted score to the candidate phrase based on the number or percentage of trend analysis agents that have reached evaluation threshold or otherwise is in the second state with the candidate phrase. The scoring engine 230 can also assign a weighted score to the candidate phrase based on the number of differently configured types of the trend analysis agents. For example, if two different types of agents reached threshold with the candidate phrase, the score may be multiplied by 2×. The trend identification engine 232 can determine, for example, using the weighted score, whether the candidate phrase is a weak or strong trend.

One embodiment of the trending engine 214 includes a trend identification engine 232. The trend ID engine 232 can be coupled to the trend analysis engine 228, the scoring engine 230, and/or the feed prioritization engine 234. The trend ID engine 232 can be implemented, for example, as software embodied in a computer-readable medium or computer-readable storage medium on a machine, in firmware, in hardware, in a combination thereof, or in any applicable known or convenient device or system. The trend ID engine 232 can include any combination of hardware components and/or software agents able to identify trends based on the results of analyzing candidate phrases.

In one embodiment, if the candidate phrase is determined by at least two of the trend analysis agents of differently configured types to have met the associated thresholds, the trend ID engine 232 identifying the candidate phrase as a trended phrase that corresponds to an identified trend. In addition, the trend ID engine 232 can identify a candidate phrase as a trended phrase based on a number or percentage of trend analysis agents assigned to analyze the candidate phase that are in the second state (active state).

The trend ID engine can also perform a search on a candidate phrase or a trended phrase and determine whether the number of search results exceeds a certain value. If the number of search results is lesser than a certain value, the trend ID engine 232 can eliminate the phrase as being a candidate for a trended phrase or a trended phrase. The trend ID engine 232 can also analyze the temporal characteristics of the search results to determine whether the feeds or articles are temporally relevant to determine whether the candidate phrase corresponds to a current trend.

One embodiment of the trending engine 214 includes a feed prioritization engine 234. The prioritization engine 234 can be coupled to the trend ID engine 232. The prioritization engine 234 can be implemented, for example, as software embodied in a computer-readable medium or computer-readable storage medium on a machine, in firmware, in hardware, in a combination thereof, or in any applicable known or convenient device or system. The prioritization engine 234 can include any combination of hardware components and/or software agents able to present trended feeds in a host user interface and depict the feeds as being associated with an identified trend.

In addition, the prioritization engine 234 can present trended feeds as having a higher priority (e.g., more readily accessible to a user) in the hosted interface. In one embodiment, the prioritization engine 234 the trended phrases/words are depicted as selectable links in the hosted user interface. When a user selects a trended phrase, the prioritization engine 234 can retrieve feeds having content related to the actual trend and presents the feeds in the hosted interface. An example of the hosted user interface showing trends and feeds relevant to a selected trend is illustrated with further reference to FIG. 4.

Moreover, the components of the trending engine 214 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the host server 200 without deviating from the spirit of the disclosure.

FIG. 3 depicts a block diagram of the trending parameter computation engine 324 in the trending engine.

The trending parameter computation engine 324 includes, in one embodiment, a term frequency computation engine 302, a document frequency computation engine 304, a time occurrence frequency tracker 306, and/or a click rate tracker 308. Each module has been described with reference to the example of FIG. 2B. Note that additional or less modules can be included without deviating from the spirit of the novel disclosure.

Moreover, the components of the trending parameter computation engine 324 are a functional unit that may be divided over multiple computers and/or processing units. Furthermore, the functions represented by the devices can be implemented individually or in any combination thereof, in hardware, software, or a combination of hardware and software. Different and additional hardware modules and/or software agents may be included in the trending parameter computation engine 324 without deviating from the spirit of the disclosure.

FIG. 4 illustrates an example of a screenshot 400 showing trends 402 identified from feeds and web feeds 406 that are relevant to a selected trend 404.

The host interface 400 can show the top trends 402 that are temporally and/or geographically relevant. Each of the trends shown in 402 can be selected by users to view more feeds or articles related to that trend. For example, when the trend "market street" 404 is selected, the system automatically performs a search on "market street" and retrieves feeds 406 that are relevant for presentation to the user in the interface 400.

Feeds over a certain period of time can be retrieved to be presented in user interface 400 to ensure that the content is temporally relevant to an identified trend. In addition, each feed or article may be published with a time stamp or other indicator showing when the feed was published. Each feed can be commented on, shared or emailed to other users. In some instances, the source of the feed is also shown for each feed entry.

FIG. 5 illustrates an example of a flow diagram 500 showing a process for using trend analysis agents configured with different trend analysis parameters to detect trends.

In step 502, word 1 gets assigned to an Agent A of type 1. The type indicators correspond to a type of trending parameter used by the agent to perform analysis. In this example, Agent A is also passive (e.g., state 1) and has not reached evaluation threshold. In most instances, words are assigned to agents that are in a passive state.

In step 504, Agent A has performed the analysis (e.g., using a trending parameter) and determines whether evaluation threshold has been reached. If so, in step 506, Agent A is then activated with word 1 (Agent A is now in 'state 2' in step 508) and in step 526, the system selects an Agent B. The Agent B may be of any configured type (e.g., uses any trending parameter to perform its analysis).

In step 528, the system determines whether Agent B is also active with the same word 1 as Agent A. If not, Agent A remains active in step 530. If so, in step 532, Agent A is deactivated (Agent A is now passive/in 'state 1' in step 534).

If at step 504, it is determined that Agent A has not reached threshold, then in step 512, an Agent C of the same type 1 is selected. In step 518, it is determined whether Agent C is active. If not, in step 522, Agent A remains passive. If so, in step 516, the system determines and retrieves the word (e.g., 'Word x' in 514) with which Agent C is active using. In step 520, the Agent A is then activated with Word x (Agent A is now active with word x in 524).

The same processes for passive and active agents are similarly repeated and candidate phrases used for identifying trends can be identified by looking at the states of the agents. The words/phrases with which the agents became active or inactive while analyzing can be used in identifying candidate phrases and/or trended phrases.

FIG. 6 illustrates how factorization of a matrix 602 is used to extract candidate phrases for use in evaluation of potential trends.

The example process shown in the diagram of 610 depicts the extraction of words or phrases from the title and the summary of a story or feed. From the title and the summary, the term frequency and document frequency of phrases or words (e.g., 'dog', 'cat', 'cow', 'sheep', etc.) are determined.

The term frequency and the document frequency are used to select the words used in the matrix V 602. By performing factorization on matrix V 602 by any known and/or convenient means (e.g., non-negative matrix factorization, singular value decomposition, etc.), matrices W 604 and H 606 (where V~W*H) can be determined. Using matrices W 604 and H 606, the features of the feeds can be identified. In addition, candidate phrases and/or words used for identifying trends in feeds or articles can also be selected from matrices W 604 and/or H 606.

Figure 7:
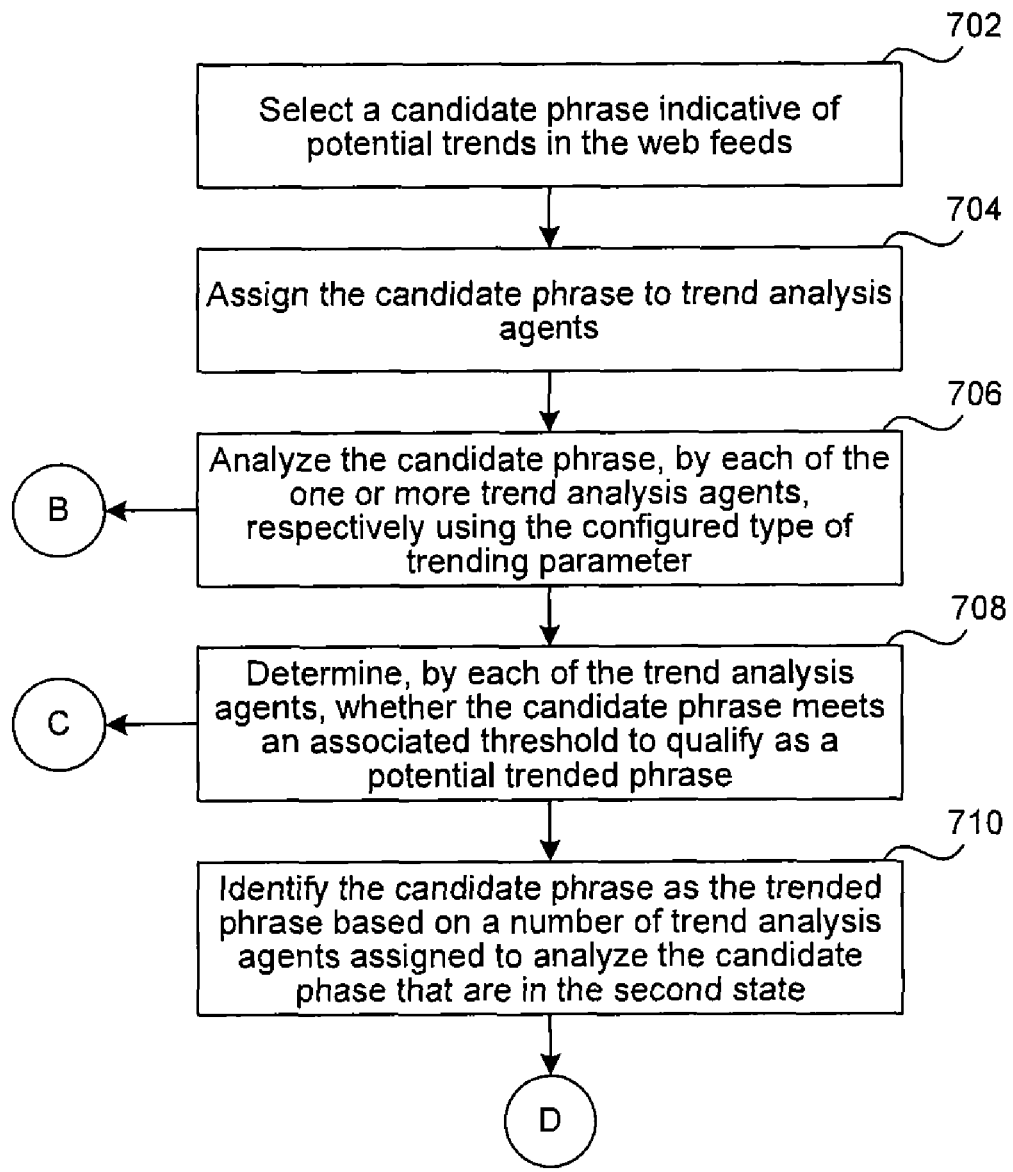
FIG. 7 depicts a flow chart showing example processes for identifying candidate phrases as a trended phrase using trend analysis agents.

FIG. 7 depicts a flow chart showing an example process for identifying candidate phrases as a trended phrase using trend analysis agents.

In process 702, a candidate phrase indicative of potential trends in the web feeds is selected. The candidate phrase can be selected according to any known and/or convenient method. The candidate phrase can include one or more words or can include any portion of a sentence.

The candidate phrase can be extracted from the title of an article or web feed and/or the summary of the article/web feed. The candidate phrases are in some embodiments selected based on the frequency of occurrence in the feed or a portion of the feed (e.g., in the title and/or the summary). Candidate phrases can also be selected based on the number of percentage of feeds or articles across which they occur.

In some instances, the candidate phrase is selected based on the parts-of-speech, for example, a phrase can be selected if it is one of: a gerund, a infinitive, a proper noun, or a noun-verb clause.

In process 704, the candidate phrase is assigned to trend analysis agents, which are configured to analyze the assigned phrase using a trending parameter. Each agent is typically configured to perform the analysis using a configured type of trending parameter, which includes, by way of example but not limitation, a time occurrence frequency of the candidate phrase, a click occurrence frequency, term occurrence frequency in a web feed, and/or a document occurrence frequency over a set of web feeds. The term occurrence frequency and the document occurrence frequency can be computed from a portion of the feeds (e.g., using a title or summary of the web feeds).

In general, the candidate phrase is randomly assigned to one or more trend analysis agents. Other candidate phrases can also be assigned to agents for analysis although typically, an agent is assigned one phrase to analyze at a time (e.g., until it is determined whether evaluation threshold was reached for the phrase). In addition, the candidate phrase is typically assigned to an agent that is of a "first state" (e.g., when an evaluation threshold has not yet been met).

In process 706, the candidate phrase is analyzed by each of the one or more trend analysis agents, respectively using the configured type of trending parameter. The analysis process is described with further reference to the example of FIG. 8.

In process 708, it is determined by each of the trend analysis agents, whether the candidate phrase meets an associated threshold to qualify as a potential trended phrase. At this stage, whether the trended phrase is weak or strong can also be determined. This process is illustrated with further reference to the example of FIG. 9.

Figure 10:
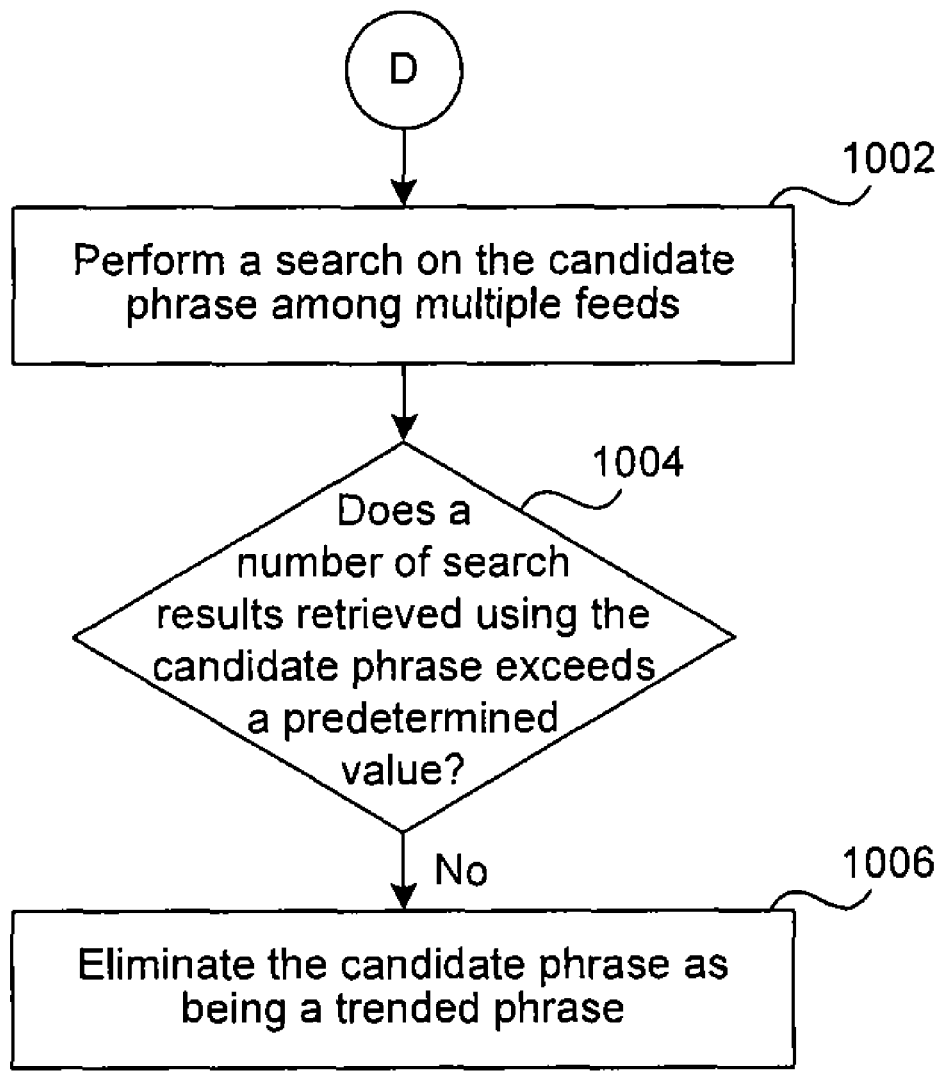
FIG. 10 depicts a flow chart showing an example process for using a search filter to verify an identified trend.

In process 710, the candidate phrase is identified as the trended phrase based on a number of trend analysis agents assigned to analyze the candidate phase that are in the second state. After a trended phrase has been identified, additional filtering processes can be performed to further verify the validity that a trended phrase corresponds to a trend. An example of a process for using a search filter to verify an identified trend is illustrated in FIG. 10. In detecting an identified trend, trended feeds having content related to the actual trend can be presented as having a higher priority in the hosted interface. The trended phrases can also be indicated as such on the hosted interface and may be selectable, as illustrated in the example screenshot of FIG. 4.

Figure 8:
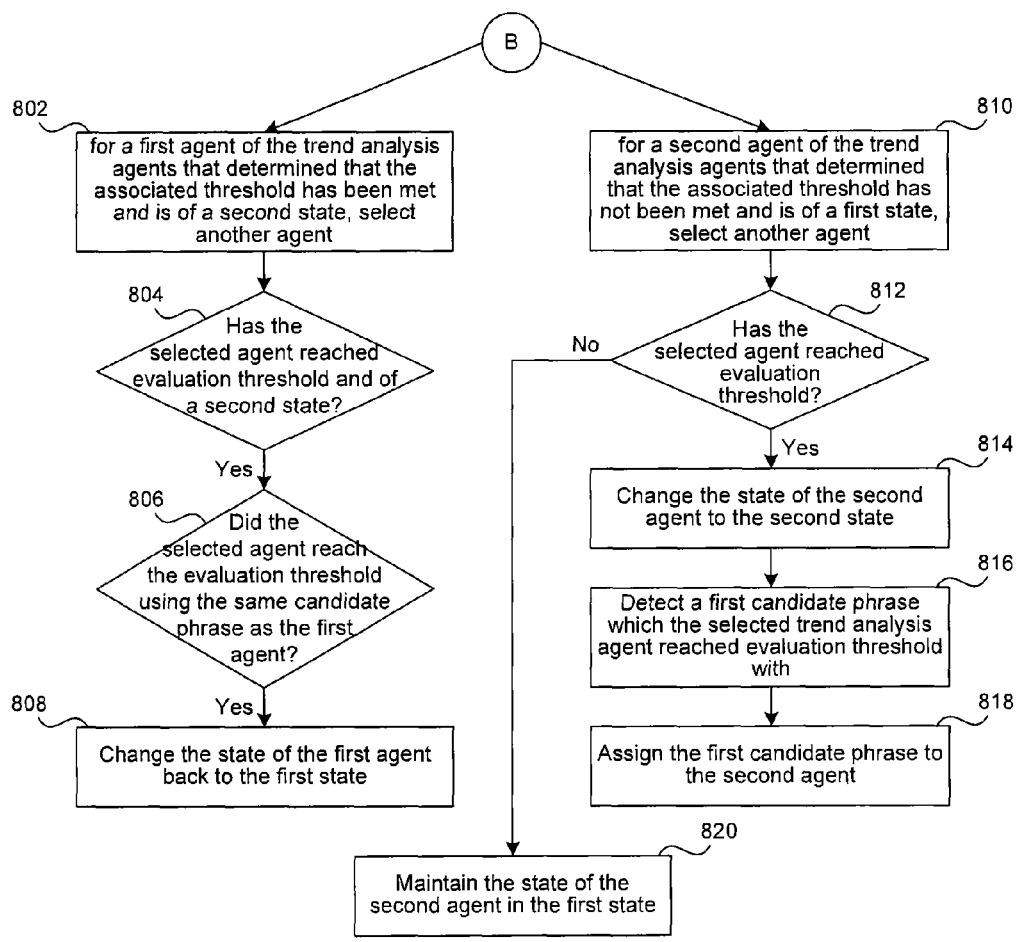
FIG. 8 depicts a flow chart showing an example process for analyzing candidate phrases using trend analysis agents.

FIG. 8 depicts a flow chart showing an example process for analyzing candidate phrases using trend analysis agents. This process is also illustrated in an example diagram shown in FIG. 5.

In process 802, for a first agent that determined that the associated threshold has been met and is of a "second state", another agent is selected. In process 804, it is determined whether the selected agent has reached evaluation threshold (e.g., in the second state).

If so, in process 806, it is determined whether the selected agent has reached the evaluation threshold using the same candidate phrase as the first agent. If so, in process 808, the state of the first agent is changed back to the first state (e.g., deactivated state). If not, the state of the first agent is maintained active (in the second state).

For a second agent that determined that the associated threshold has not yet been met and is of the first state, another agent is also selected in process 810. The agent that is selected is typically configured to use the same trending parameter for analysis as the second agent. In process 812, it is determined whether the selected agent has reached evaluation threshold. If not, in process 820, the state of the second agent is maintained in the first (inactive) state.

If so, in process 814, the state of the second agent is changed to the second state (active state). In process 816, a first candidate phrase which the selected trend analysis agent reached evaluation threshold with is detected. In process 818, the detected first candidate phrase is assigned to the second agent such that the second agent is now active with the first candidate phrase (e.g., same as the selected agent).

By repeating this process for multiple agents over multiple iterations (as illustrated in graphically in the example diagram of FIG. 5), a candidate phrase can be identified as the trended phrase based on a number of trend analysis agents assigned to analyze the candidate phase that are in the second state (e.g., having reached evaluation threshold). Additionally, candidate phrases can also be identified as a trended phrase when a percentage or number of agents is active in the second state. The trended phrases can be determined as trends.

FIG. 9 depicts a flow chart showing an example process for using weighted scores to determine whether an identified trend is weak or strong.

In process 902, each of the trend analysis agents assigns a score to the candidate phrase. The score can be assigned based on the analysis using a trending parameter (e.g., term occurrence frequency, document occurrence frequency, clicks, temporal, etc.). The scoring algorithm can be different for different trending parameters (e.g., proportional to term frequency, proportional to document frequency, proportional to the number of clicks, proportional to term frequency*document frequency, or proportional to the inverse of sqrt (t_current−t_previous). T_current typically corresponds to the current time when analysis is being performed and t_previous can correspond to when the document/story was retrieved (e.g., (t_current−tprevious)=how old a story is). Generally, the candidate phrase can be determined to qualify as a potential trended phrase when the score exceeds the associated threshold.

In process 904, a number of trend analysis agents that has determined that the candidate phrase qualifies as the potential trended phrase is aggregated. In process 906, a number of differently configured types of trend analysis agents that have determined that the candidate phrase qualifies as the potential trended phrase is aggregated.

In process 908, a weighted score is assigned to the candidate phrase based on the number of differently configured types (e.g., types of trending parameters) of the trend analysis agents that reached evaluation threshold. In general, the more different types of agents (e.g., since different trending parameters are used) that have reached threshold for a phrase, the higher the probability that the candidate phrase corresponds to a trend or a stronger trend. Thus, a higher weight is generally assigned to phrases having agents of differently configured types that reached threshold.

In some instances, a candidate phrase can be identified as the trended phrase that corresponds to an identified trend if the candidate phrase is determined by at least two of the trend analysis agents of differently configured types to have met the associated thresholds. Alternatively, three or four different types may be required for a candidate phrase to qualify as a trended phrase.

In process 910, a weighted score is assigned to the candidate phrase based on the number of trend analysis agents. Generally, the higher the number of agents, the higher the weight. In process 912, it is determined by the weighted score, whether the identified trend associated with the candidate phrase is a weak or strong trend. Typically, a higher weighted score corresponds to a stronger trend.

FIG. 10 depicts a flow chart showing an example process for using a search filter to verify an identified trend.

In process 1002, a search on the candidate phrase is performed among multiple feeds. In process 1004, it is determined whether a number of search results retrieved using the candidate phrase exceeds a predetermined value. Since a trend or topic/content that is otherwise popular would typically have a reasonable number of related results, if the search result is in significant, the trended phrase may not correspond to an actual trend. If not, in process 1006, the candidate phrase is eliminated from being a trended phrase. The search can be performed on candidate phrases before they have been selected as trended phrases and/or trended phrases.

FIG. 11 depicts a flow chart showing an example process for using a scoring algorithm to determine whether a candidate phrase corresponds to an actual trend.

In process 1102, a candidate phrase indicative of a potential trend in the web feeds is identified. In one embodiment, the system analyzes the titles and/or the summaries of web feeds and tags parts of speech in the titles and/or summaries. The candidate phrase can be identified using parts-of-speech analysis. The candidate phrase can also be selected based on a term frequency of occurrence of the candidate phrase in the titles and summaries of the web feeds and/or a document frequency of occurrence of the candidate phrase across the web feeds. Example processes for extracting candidate phrases are illustrated with further reference to FIG. 12.

In process 1104, the web feeds are analyzed using the candidate phrase according to a trending parameter, for example, according to any known or convenient method. For example, trending analysis agents can be used for the analysis. The trending parameter can include by way of example but not limitation, time occurrence frequency of the candidate phrase, click occurrence frequency of the candidate phase, term occurrence frequency in a web feed, and/or the document occurrence frequency over a set of web feeds.

In process 1106, a score is assigned to the candidate phrase using the trending parameter, based on the analysis. In process 1108, it is determined whether the candidate phrase is a trended phrase that corresponds to an actual trend, according to the score. In process 1110, trended feeds having content related to the actual trend are presented as having a higher priority in the hosted interface. In process 1112, the trended phrase is depicted as a selectable mechanism in the hosted interface. In process 1114, user selection of the trended phrase is detected in the user interface. In process 1116, additional feeds having content related to the actual trend are retrieved and the feeds in are presented the hosted interface.

Figure 12:
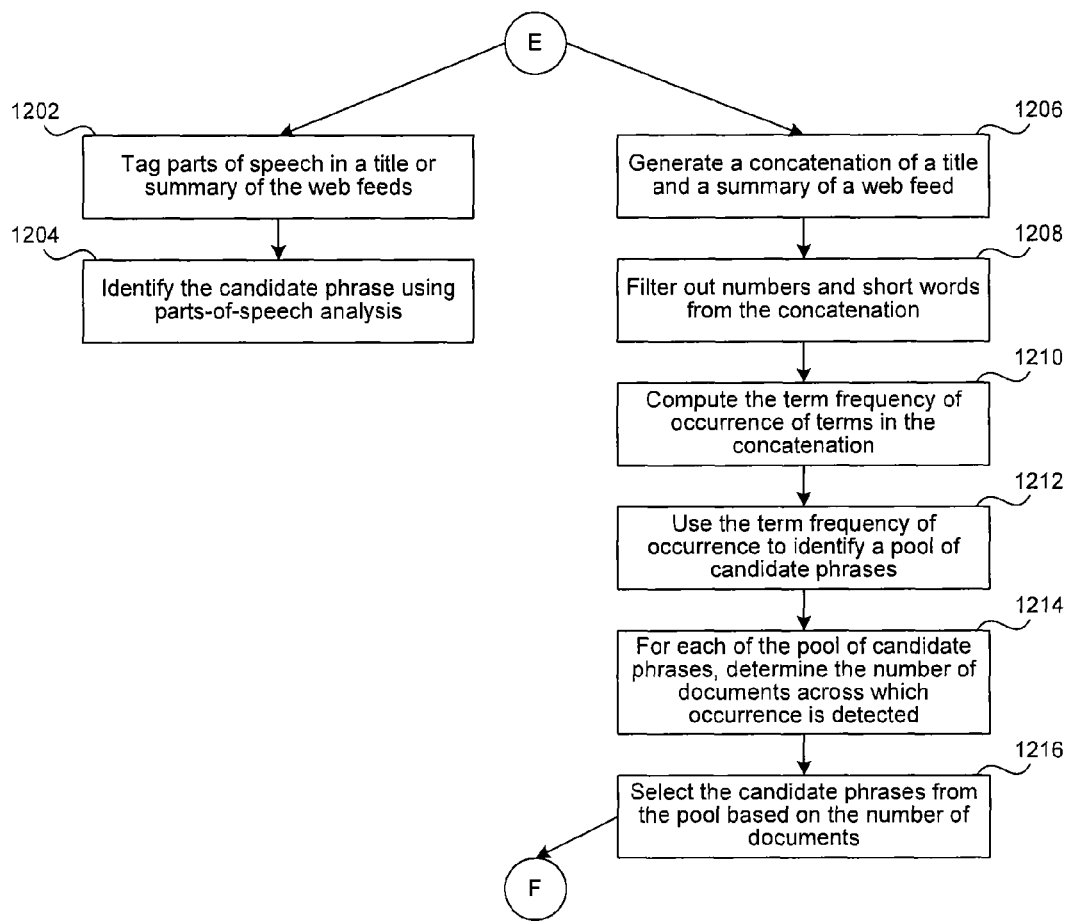
FIG. 12 depicts a flow chart showing an example process for using a scoring algorithm to determine whether a candidate phrase corresponds to an actual trend.

FIG. 12 depicts a flow chart showing an example process for using a scoring algorithm to determine whether a candidate phrase corresponds to an actual trend.

In process 1202, parts of speeches are tagged in a title or summary of the web feeds. In process 1204, the candidate phrase is identified using parts-of-speech analysis. For example, parts of speeches such as a gerund, a infinitive, a proper noun, and/or a noun-verb clause can be selected as candidates.

In another example, in process 1206, a concatenation of a title and a summary of a web feed is generated. In process 1208, numbers and/or short words are filtered out from the concatenation. In process 1210, the term frequency of occurrence of terms in the concatenation is computed. In process 1212, the term frequency of occurrence is used to identify a pool of candidate phrases. In process 1214, for each of the pool of candidate phrases, the number of documents across which occurrence is detected is determined. In process 1216, the candidate phrases are selected from the pool based on the number of documents detected in the previous step.

Figure 13:
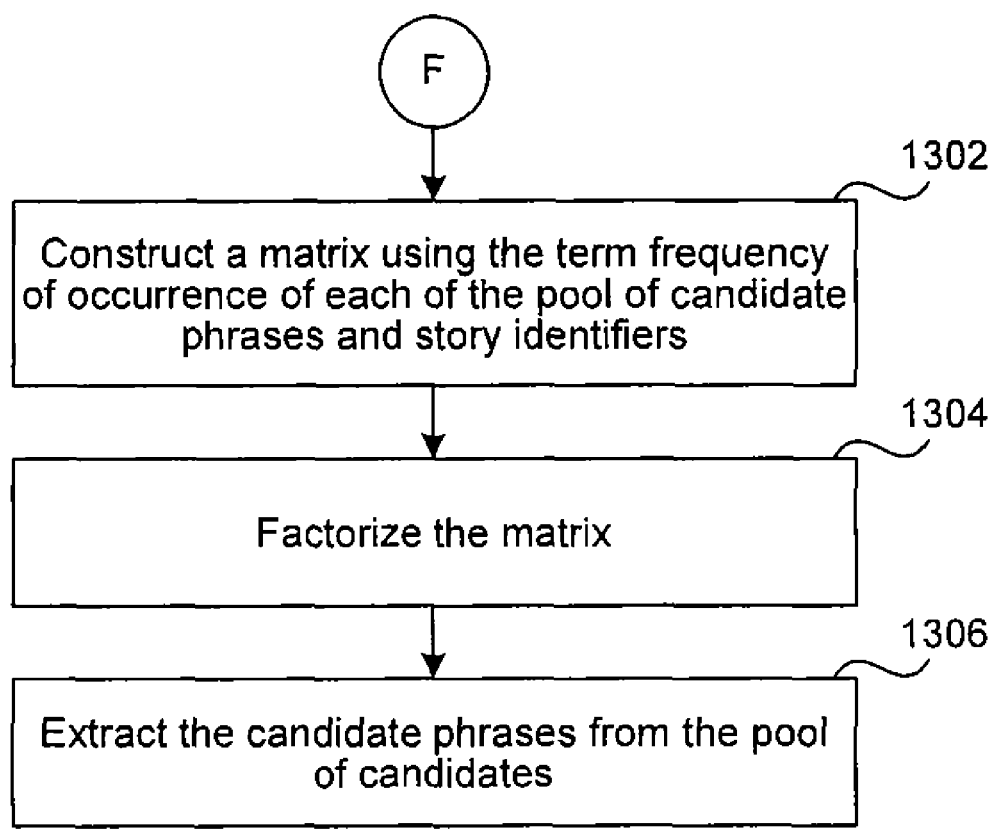
FIG. 13 depicts a flow chart showing an example process for extracting candidate phrases using matrix factorization.

FIG. 13 depicts a flow chart showing an example process for extracting candidate phrases using matrix factorization.

In process 1302, a matrix is constructed using the term frequency of occurrence of each of the pool of candidate phrases and story identifiers (e.g., a document-term/phrase matrix), as shown in the example process 610 on FIG. 6. An example of such a matrix is illustrated as matrix V in the example of FIG. 6.

In process 1304, the matrix is factorized. For example, the matrix V is factorized in to matrices W and H, in the example of FIG. 6. In process 1306, the candidate phrases are extracted from the pool of candidates, for example, from the factorized matrix (e.g., matrix W or H). In addition, features for the document or feed can also be extracted from the factorized matrix (e.g., matrix W or H).

Figure 14:
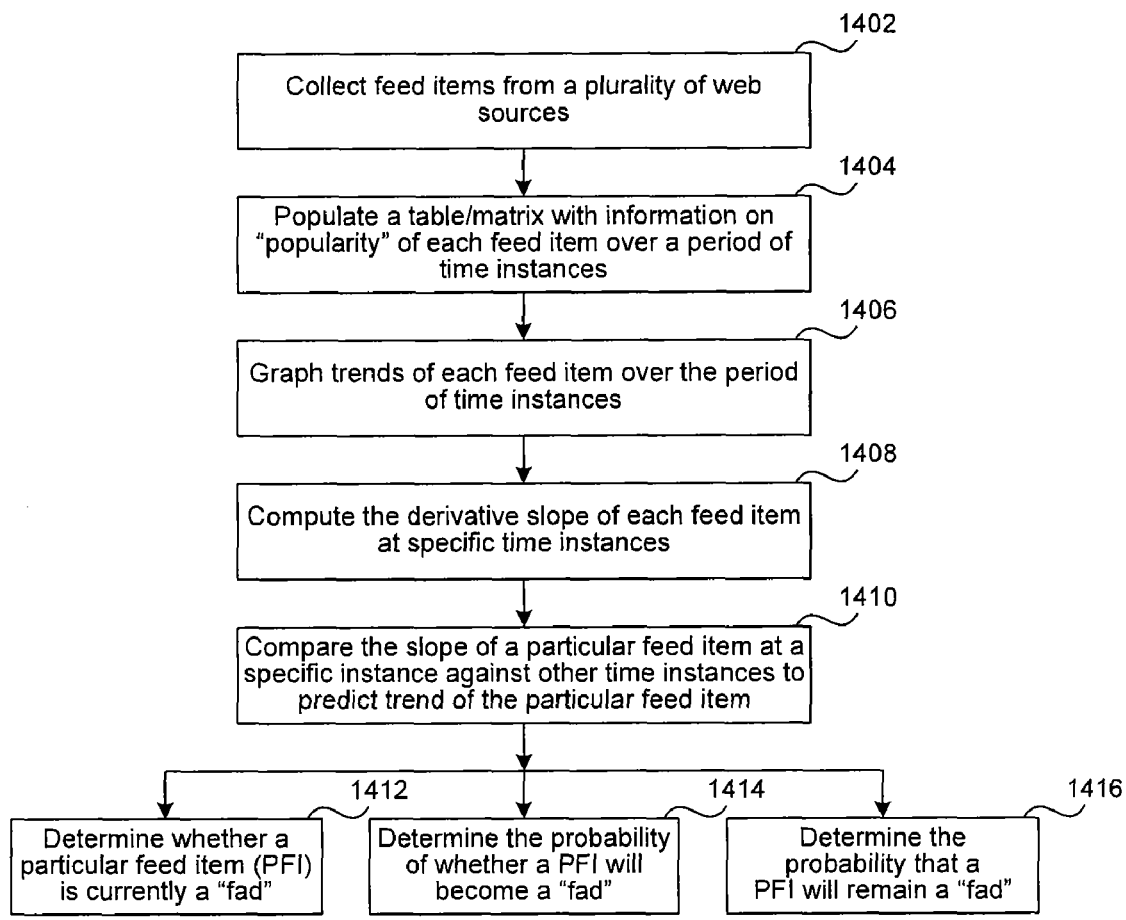
FIG. 14 depicts a flowchart of an example process for using slopes to predict trends of feed items.

FIG. 14 depicts a flowchart of an example process for using slopes to predict trends of feed items.

In process 1402, the feed items are collected from a plurality of webs sources. These web sources include, for example, social networking sites or product/event review sites, where users or critics discuss a variety of topics. A feed item, for example, is a particular topic of discussion. In one example, a feed item could be a local musical event. Web engines and RSS feeds are used, for example, to garner feed items from a wide variety of web sources.

In process 1404, the feed items are populated in a table or a matrix to perform further prediction operations. An example of such a table is shown in FIG. 15A. After populating the feed item table, graph trends for each of the feed items are computed 1406. One example of such a graph is illustrated in FIG. 15B. By comparing the differential value (or slope) of the graph at a particular time instance in process 1406, and comparing that value against one or more prior time instances in process 1408, the trend of the particular feed item is predicted. The trend prediction is then used in at least one of three ways.

In one embodiment, the predicted trend is used to determine whether a particular feed item is currently a "fad", in process 1410. The term fad refers to the gaining popularity of a particular feed item, and can be determined by using any number of means known to people skilled in the art. In another embodiment, the predicted trend is used to determine the probability that a particular feed item will become a fad within a certain time period, in process 1412. In yet another embodiment, the predicted trend is used to determine the probability that a current "fad" item will likely remain a fad item within a predefined time period, in process 1414.

FIG. 15A depicts an example of a table used for tracking popularity information of feed items over periods of time.

In the example table of FIG. 15A, the feed items 1500 and popularity of feed items at different time instances 1505 are tabulated. In one embodiment, feed items 1 through n 1520 are tabulated against time instances at five minute increments 1510. The numbers within the table 1550 correspond to the popularity of the particular feed item at different time instances.

FIG. 15B depicts an example of a graph of the popularity information for identifying trends.

Here, the popularity of a particular feed item (n in this example) 1560 is plotted at different time instances 1565. The slope of the graph is then computed for each feed item by doing a differential operation on the graph of each feed item, and example of which is indicated in 1570. By comparing the differential value (or slope) of the graph at a particular time instance, and comparing that value against one or more prior time instances, the trend of the particular feed item is predicted. The trend prediction is then used in at least one of three ways.

FIG. 16 shows a diagrammatic representation of a machine in the example form of a computer system 1600 within which a set of instructions, for causing the machine to perform any one or more of the methodologies discussed herein, may be executed.

In the example of FIG. 16, the computer system 1600 includes a processor, memory, non-volatile memory, and an interface device. Various common components (e.g., cache memory) are omitted for illustrative simplicity. The computer system 1500 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, isdn modem, cable modem, token ring interface, satellite transmission interface (e.g. "direct PC"), or other interfaces for coupling a computer system to other computer systems. The interface 208 can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of identifying trends in web feeds collected from various content servers to be presented to a user on a device via a hosted interface, comprising:
    selecting a candidate phrase indicative of potential trends in the web feeds;
    assigning the candidate phrase to trend analysis agents;
    wherein, each the trend analysis agents is configured to analyze the candidate phrase using a configured type of trending parameter;
    analyzing the candidate phrase, by each of the one or more trend analysis agents, respectively using the configured type of trending parameter;
    determining, by each of the trend analysis agents, whether the candidate phrase meets an associated threshold to qualify as a potential trended phrase;
    wherein, the candidate phrase is assigned to a trend analysis agent that is of a first state when an evaluation threshold has not yet been met; and
    wherein, for a first agent of the trend analysis agents that determined that the associated threshold has been met and is of a second state, selecting another agent;
    in response to detecting that the another agent is of the second state when the evaluation threshold has been reached and that the another agent reached the evaluation threshold analyzing the same candidate phrase, changing the state of the first agent back to the first state.

2. The method of claim 1, wherein,
    for a second agent of the trend analysis agents that determined that the associated threshold has not been met and is of a first state, selecting another agent;
    wherein, the another agent is configured to use a same trending parameter for analysis as the second agent;
    in response to detecting that the another trend analysis agent having reached the evaluation threshold, changing the state of the second agent to the second state.

3. The method of claim 2, further comprising:
    detecting a first candidate phrase which the another trend analysis agent reached evaluation threshold with;
    assigning the first candidate phrase to the second agent.

4. The method of claim 3, further comprising,
    performing a search on the candidate phrase;
    determining whether a number of search results retrieved using the candidate phrase exceeds a predetermined value;
    in response to determining that the number of search results is less than the predetermined value, eliminating the candidate phrase as being a candidate for trended phrase or a trended phrase.

5. The method of claim 4, further comprising, eliminating the candidate phrase from being a trended phrase based on a quantity of search results generated using the candidate phrase.

6. The method of claim 2, further comprising:
    in response to detecting that the another trend analysis agent has not reached the evaluation threshold, maintaining the state of the second agent in the first state.

7. The method of claim 2, further comprising, identifying the candidate phrase as the trended phrase based on a number of trend analysis agents assigned to analyze the candidate phase that are in the second state.

8. The method of claim 1, further comprising, identifying the candidate phrase as the trended phrase that corresponds to an identified trend if the candidate phrase is determined by at least two of the trend analysis agents of differently configured types to have met the associated thresholds.

9. The method of claim 1, further comprising,
assigning, by each of the one or more trend analysis agents, a score to the candidate phrase;
wherein, the candidate phrase is determined to qualify as the potential trended phrase when the score exceeds the associated threshold.

10. The method of claim 9, further comprising,
aggregating a number of trend analysis agents that determined that the candidate phrase qualifies as the trended phrase;
aggregating a number of differently configured types of the trend analysis agents that determined that the candidate phrase qualifies as the trended phrase.

11. The method of claim 10, further comprising,
assigning a weighted score to the candidate phrase based on the number of trend analysis agents;
determining, by the weighted score, whether the identified trend which is associated with the candidate phrase is a weak or strong trend.

12. The method of claim 10, further comprising,
assigning a weighted score to the candidate phrase based on the number of differently configured types of the trend analysis agents;
determining, by the weighted score, whether the identified trend associated with the candidate phrase is a weak or strong trend.

13. The method of claim 1, wherein, in detecting the identified trend, presenting trended feeds having content related to the actual trend as having a higher priority in the hosted interface.

14. The method of claim 1, wherein, each of the candidate phrases are randomly assigned to the one or more trend analysis agents.

15. The method of claim 1, wherein the candidate phrase includes one or more words.

16. The method of claim 1, wherein, the configured type of trending parameter is one of: a time occurrence frequency of the candidate phrase and a click occurrence frequency.

17. The method of claim 1, wherein, wherein, the configured type of trending parameter is one of: a term occurrence frequency in a web feed, and a document occurrence frequency over a set of web feeds.

18. The method of claim 17, wherein, the term occurrence frequency and the document occurrence frequency are computed using a title or summary of the web feeds.

19. The method of claim 1, further comprising, extracting the candidate phrase from a title or summary of the web feeds.

20. The method of claim 1, wherein, the candidate phrase is selected based on the parts-of-speech.

21. The method of claim 20, wherein, the candidate phrase is one of: a gerund, a infinitive, a proper noun, and a noun-verb clause.

22. A system for identifying trends in web feeds collected from various content servers to be presented to a user on a device via a hosted interface, comprising:
means for, selecting a candidate phrase indicative of potential trends in the web feeds;
means for, assigning the candidate phrase to trend analysis agents;
wherein, each the trend analysis agents is configured to analyze the candidate phrase using a configured type of trending parameter;
means for, analyzing the candidate phrase, by each of the one or more trend analysis agents, respectively using the configured type of trending parameter;
means for, determining, by each of the trend analysis agents, whether the candidate phrase meets an associated threshold to qualify as a potential trended phrase;
means for, selecting another agent of the first state and assigning the candidate phrase to the another agent for analysis, for a first agent of the trend analysis agents that determined that the associated threshold has been met and is of a second state;
means for, changing the state of the first agent back to the first state in response to the another agent reaching the evaluation threshold;
means for, selecting another agent of the first state and assigning the candidate phrase to the another agent for analysis, for a second agent of the trend analysis agents that determined that the associated threshold has not been met and is of a first state;
wherein, the another agent is configured to use a same trending parameter for analysis as the second agent;
means for, changing the state of the second agent to the second state, in response to the another trend analysis agent reaching the evaluation threshold;
means for, identifying the candidate phrase as the trended phrase based on a number of trend analysis agents assigned to analyze the candidate phase that are of the second state.

23. A system for identifying trended phrases which correspond to trends in web feeds collected from multiple content servers, comprising:
a repository to store candidate phrases that potentially correspond to trends in the web feeds;
trend analysis agents instantiated in a computer system;
wherein, the trend analysis agents analyze the candidate phases using trending parameters and generates trending analysis data relating to each of the candidate phrases;
wherein, the trending analysis data is stored in the repository and used in identifying trended phrases from the candidate phrases;
wherein, the candidate phrase is assigned to a trend analysis agent that is of a first state when an evaluation threshold has not yet been met; and
wherein, for a first agent of the trend analysis agents that determined that the associated threshold has been met and is of a second state, selecting another agent;
in response to detecting that the another agent is of the second state when the evaluation threshold has been reached and that the another agent reached the evaluation threshold analyzing the same candidate phrase, changing the state of the first agent back to the first state.

* * * * *